(12) United States Patent
Kurokawa et al.

(10) Patent No.: US 10,200,917 B2
(45) Date of Patent: Feb. 5, 2019

(54) COMMUNICATION DEVICE, CORE NETWORK NODE, MOBILE COMMUNICATION SYSTEM, COMMUNICATION METHOD, AND STORAGE MEDIUM

(71) Applicant: NEC Corporation, Tokyo (JP)

(72) Inventors: Yasunari Kurokawa, Tokyo (JP); Hideki Kozuka, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 214 days.

(21) Appl. No.: 14/909,243

(22) PCT Filed: Jul. 24, 2014

(86) PCT No.: PCT/JP2014/003906
§ 371 (c)(1),
(2) Date: Feb. 1, 2016

(87) PCT Pub. No.: WO2015/015773
PCT Pub. Date: Feb. 5, 2015

(65) Prior Publication Data
US 2016/0174113 A1 Jun. 16, 2016

(30) Foreign Application Priority Data

Jul. 31, 2013 (JP) .................... 2013-158461

(51) Int. Cl.
*H04W 36/00* (2009.01)
*H04W 36/02* (2009.01)
*H04W 40/22* (2009.01)

(52) U.S. Cl.
CPC ..... *H04W 36/0055* (2013.01); *H04W 36/023* (2013.01); *H04W 40/22* (2013.01)

(58) Field of Classification Search
None
See application file for complete search history.

(56) References Cited

U.S. PATENT DOCUMENTS

2010/0216471 A1* 8/2010 Meyer ................... H04W 36/26
455/436
2011/0013593 A1* 1/2011 Hapsari ................. H04W 36/02
370/331

(Continued)

FOREIGN PATENT DOCUMENTS

JP 2011-223525 11/2011
WO 2012111844 8/2012

OTHER PUBLICATIONS

Extended European Search Reported—EP 14 83 1716—dated Dec. 12, 2016.

(Continued)

*Primary Examiner* — James P Duffy
(74) *Attorney, Agent, or Firm* — Young & Thompson

(57) ABSTRACT

In the case where a wireless terminal conducts a handover from a first device to a second device, a communication device of this exemplary embodiment performs communication with the second device and a core network node, in order to notify an appropriate device of information regarding the transfer path of data. The communication device receives control information from the core network node upon the handover. The control information is information regarding the transfer path of data to be transferred from the first device to the second device.

18 Claims, 19 Drawing Sheets

(56) References Cited

U.S. PATENT DOCUMENTS

| | | | |
|---|---|---|---|
| 2011/0098048 A1* | 4/2011 | Zhang | H04W 64/00 455/438 |
| 2011/0223919 A1* | 9/2011 | Vikberg | H04W 36/08 455/436 |
| 2013/0028237 A1* | 1/2013 | Cheng | H04W 36/0016 370/331 |
| 2013/0150037 A1 | 6/2013 | Jha | |

OTHER PUBLICATIONS

3rd Generation Partnership Project; Technical Specification Group Services and System Aspects: Telecommunication management; Performance Management (PM); Performance measurements Home enhanced Node B (HeNB) Subsystem (HeNS) (Release 10)', 3GPP Draft; 32453-A00, 3rd Generation Partnership Project (3GPP), Mobile Competence Centre; 650, Route Des Lucioles: F-06921 Sophia-Antipolis Cedex ; France, Mar. 29, 2011 (Mar. 29, 2011), XP050904907, Retrieved from the Internet: Retrieved from the Internet: URL:http://www.3gpp.org/ftp/Specs/2014-12/Rel-10/32 series/ [retrieved on Mar. 29, 2013] *Sections 4.2.1.1 and 4.2.1.3.2*.

Alcatel-Lucent, Direct path availability in target eNB [online], 3GPP TSG-RAN WG3#65 R3-091808, Internet <URL: http://www.3gpp.org/ftp/tsg_ran/WG3_lu/TSGR3_65/Docs/R3-091808.zip>, Aug. 28, 2009.

Alcatel-Lucent, Direct Path Availability in target eNB [online], 3GPP TSG-RAN WG3#65 R3-091807, Internet <URL: http://www.3gpp.org/ftp/tsg_ran/WG3_lu/TSGR3_65/Docs/R3-091807.zip>, Aug. 28, 2009.

Alcatel-Lucent, Data forwarding clean-up wrt direct/indirect path available [online], 3GPP TSG-RAN WG3#61 R3-081867, Internet <URL:http://www.3gpp.org/ftp/tsg_ran/WG3_lu/TSGR3_61/docs/R3-081867.zip> Aug. 22, 2008.

International Search Report PCT/JP2014/003906 dated Oct. 14, 2014.

* cited by examiner

Fig. 7

9.1.5.4 HANDOVER REQUEST

| IE | Presence | Range | Reference |
| --- | --- | --- | --- |
| Message Type | M | | 9.2.1.1 |
| MME UE S1AP ID | M | | 9.2.3.3 |
| Handover Type | M | | 9.2.1.13 |
| Cause | M | | 9.2.1.3 |
| UE Aggregate Maximum Bit Rate | M | | 9.2.1.20 |
| E-RABs To Be Setup List | | 1 | |
| ... | | | |
| Management Based MDT Allowed | O | | 9.2.1.83 |
| Management Based MDT PLMN List | O | | MDT PLMN List 9.2.1.89 |
| *Direct Forwarding Path Availability* | *O* | | *9.2.3.15* |

9.2.3.15 Direct Forwarding Path Availability

| IE | Presence | Range | IE type and reference |
| --- | --- | --- | --- |
| Direct Forwarding Path Availability | M | | ENUMERATED (Direct Path Available, ...) |

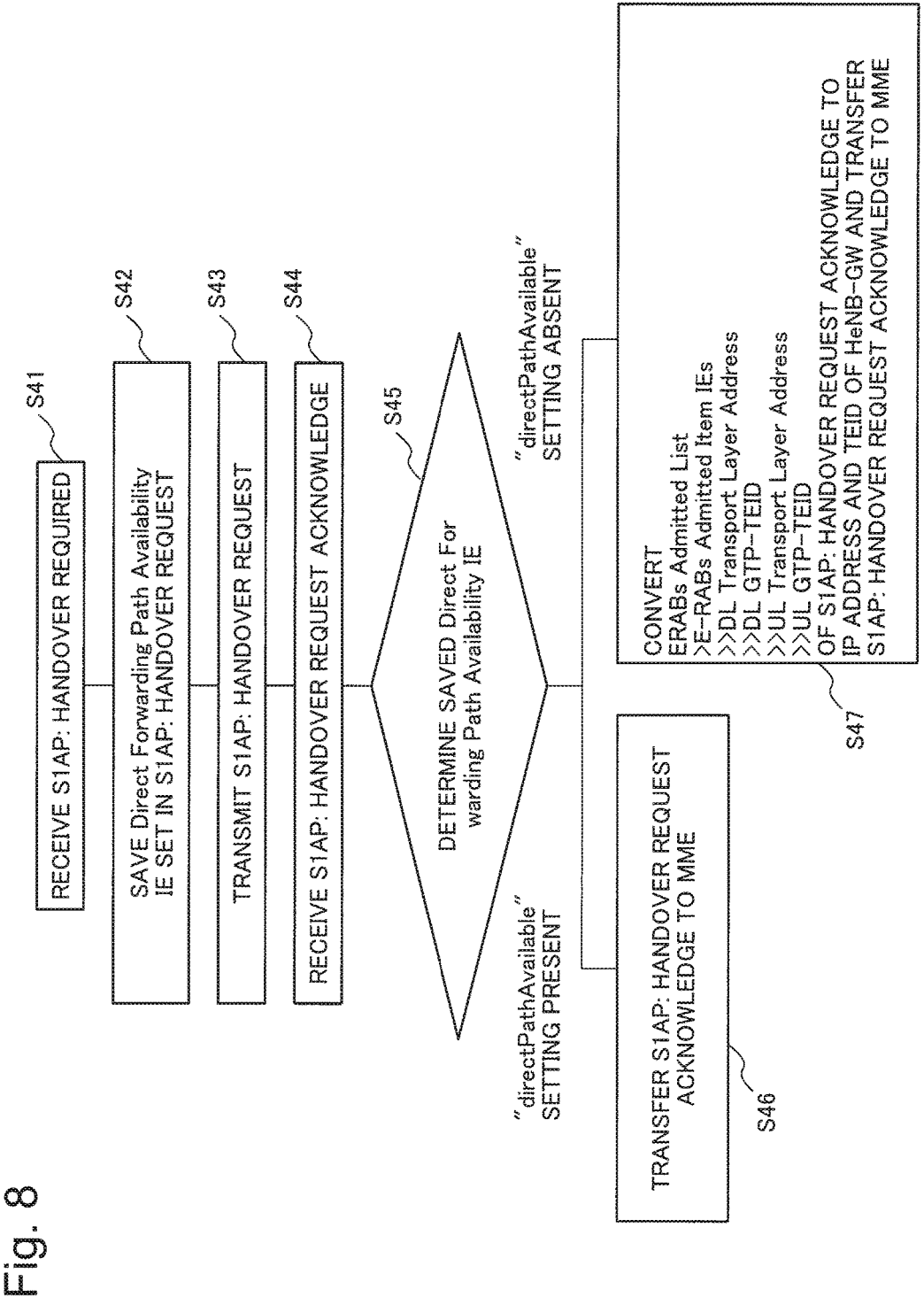

Fig. 18

| Source HeNB ID | Target HeNB ID | Direct path availability |
|---|---|---|
| HeNB_A01 | HeNB_B02 | TRUE |
| HeNB_A01 | HeNB_B03 | TRUE |
| HeNB_A01 | HeNB_B04 | FALSE |
| HeNB_A02 | HeNB_B05 | FALSE |
| ... | ... | ... |

COMMUNICATION DEVICE, CORE NETWORK NODE, MOBILE COMMUNICATION SYSTEM, COMMUNICATION METHOD, AND STORAGE MEDIUM

TECHNICAL FIELD

The disclosure of this description relates to a communication device, a core network node, a mobile communication system, a communication method, and a storage medium.

BACKGROUND ART

In a mobile communication system, it is necessary to continue communication in the case where a communication terminal has moved during communication. Therefore, a mobile communication system executes handover processing for continuing communication even in the case where a communication terminal has moved.

In a 3rd Generation Partnership Project (3GPP), a Long Term Evolution (LTE) system for realizing high-speed mobile communication is specified. In handover processing in the LTE system, two data forwarding techniques of Direct Forwarding and Indirect Forwarding are used, in order to prevent loss of data for a communication terminal that has occurred during the handover processing.

Direct Forwarding is a technique of transmitting data for a communication terminal that has occurred during handover processing from a handover-source base station to a handover-target base station, via an X2 link directly connecting the handover-source base station forming an area in which the communication terminal is currently present and the handover-target base station forming an area of destination of the communication terminal.

Indirect Forwarding is a technique of transmitting data for a communication terminal that has occurred during handover processing from a handover-source base station to a handover-target base station, via a relay device that is a device arranged within a core network to relay data.

PTL 1 discloses an X2 handover in which data forwarding is executed using an X2 interface and an S1 handover in which data forwarding is executed using an S1 interface.

CITATION LIST

Patent Literature

[PTL 1] Japanese Patent Application Laid-open No. 2011-223525

SUMMARY OF INVENTION

Technical Problem

However, PTL 1 does not disclose a specific method of identifying the type of data forwarding. Thus, an object of the present invention is to provide a mobile communication system capable of notifying an appropriate device of information regarding the transfer path of data.

Solution to Problem

A communication device according to an exemplary embodiment, in a case where a wireless terminal conducts a handover from a first device to a second device, is configured to be capable of communicating with the second device and with a core network node and configured to be capable of receiving control information from the core network node upon the handover, the control information being information regarding a transfer path of data to be transferred with respect to the second device from the first device.

A core network node according to an exemplary embodiment, in a case where a wireless terminal conducts a handover from a first device to a second device, is configured to be capable of communicating with a communication device to perform communication with the second device and configured to be capable of transmitting control information to the communication device upon the handover, the control information being information regarding a transfer path of data to be transferred with respect to the second device from the first device.

A mobile communication system according to an exemplary embodiment includes a wireless terminal that performs a handover from a first device to a second device and a communication device that performs communication with the second device and with a core network node, the core network node transmitting control information with respect to the communication device upon the handover, and the control information being information regarding a transfer path of data to be transferred with respect to the second device from the first device.

In a communication method according to an exemplary embodiment, in a case where a wireless terminal conducts a handover from a first device to a second device, control information that is information regarding a transfer path of data to be transferred with respect to the second device from the first device is received from the core network node upon the handover.

A storage medium according to an exemplary embodiment stores, in a case where a wireless terminal conducts a handover from a first device to a second device, a program for causing a computer to execute a process of receiving, from a core network node upon the handover, control information that is information regarding a transfer path of data to be transferred with respect to the second device from the first device.

Advantageous Effects of Invention

With an exemplary embodiment of the present invention, an appropriate device can be notified of information regarding the transfer path of data.

BRIEF DESCRIPTION OF DRAWINGS

FIG. 7 is a diagram illustrating the configuration of an S1AP: Handover Request message according to Exemplary Embodiment 3.

FIG. 8 is a diagram illustrating the flow of handover processing in a HeNB-GW according to Exemplary Embodiment 3.

FIG. 18 is a diagram illustrating a database managing information regarding the type of data forwarding according to Exemplary Embodiment 5.

DESCRIPTION OF EMBODIMENTS

Figure 1:
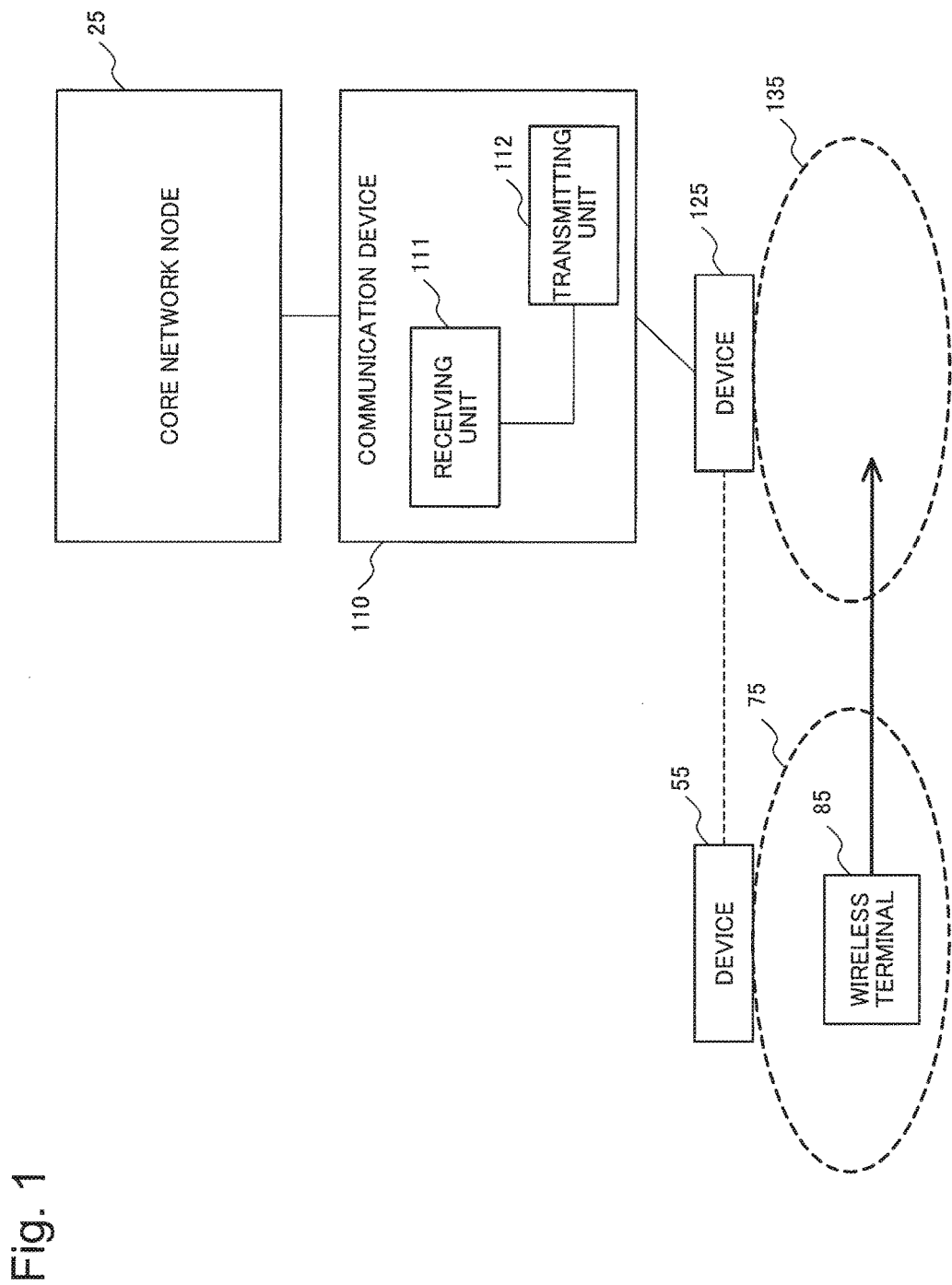
FIG. 1 is a configuration diagram of a mobile communication system according to Exemplary Embodiment 1.

A specific exemplary embodiment will be described below in detail with reference to the drawings. In each drawing, identical or corresponding elements are denote by identical reference signs. For clarity of description, redundant descriptions are omitted as necessary.

Exemplary embodiments described below can be implemented independently or can be implement in an appropriate combination. The exemplary embodiments have novel features different from each other. Thus, the exemplary embodiments contribute to solving objects or problems different from each other and contribute to producing advantageous effects different from each other.

(Exemplary Embodiment 1)

Using FIG. 1, a configuration example of a mobile communication system according to Exemplary Embodiment 1 will be described. The mobile communication system in FIG. 1 includes a core network node 25, a communication device 110, a device 55, a device 125, and a wireless terminal 85. The communication device 110 is, for example, a gateway device of a base station or a donor base station. The devices 55 and 125 are, for example, a base station or a relay node.

This diagram shows the wireless terminal 85 conducting a handover from a cell 75 formed by the device 55 to a cell 135 formed by the device 125.

The core network node 25 may be, for example, a node included in a core network including a plurality of core network nodes.

The communication device 110 performs communication with the device 125 and the core network node 25. The communication device 110 includes a transmitting unit 112 for performing communication with the device 125 and the core network node 25. Further, the communication device 110 includes a receiving unit 111 for receiving control information from the core network node 25, upon the wireless terminal 85 performing a handover.

The control information is information regarding the transfer path of data to be transferred to the device 125 from the device 55. The data to be transferred is, for example, downlink data of which transmission to the wireless terminal 85 has failed or uplink data of which transmission from the wireless terminal 85 has failed at the time of a handover.

As described above, the communication device 110 according to Exemplary Embodiment 1 can receive, from the core network node 25, information regarding the transfer path of data to be transferred to the device 125 from the device 55. Accordingly, the communication device 110 can recognize the transfer path of data to be transferred to the device 125 from the device 55 and therefore can execute processing in accordance with the transfer path of data.

(Exemplary Embodiment 2) Using FIG. 2, a configuration example of a mobile communication system according to Exemplary Embodiment 2 will be described. The mobile communication system in FIG. 2 includes a relay device 15, a relay device 90, a core network control device 20, a core network control device 100, a communication device 30, the communication device 110, a base station 40, a base station 50, and a base station 120.

The base station 50 corresponds to the device 55 in FIG. 1. The base station 40 forms a cell 60. The base station 50 forms a cell 70. The base station 120 forms a cell 130. This diagram shows a communication terminal 80 moving to the cell 130 from the cell 70. That is, the communication terminal 80 conducting a handover to the cell 130 from the cell 70 is shown. Therefore, description will be given below with the base station 50 as a handover-source base station and the base station 120 as a handover-target base station.

The communication terminal 80 corresponds to the wireless terminal 85 in FIG. 1. The communication terminal 80 may be a mobile phone terminal, a smartphone terminal, a tablet-type terminal, a computer device including a communication function, or the like. The communication terminal 80 may be called User Equipment (UE) that is used as a generic term for mobile communication terminals in 3GPP.

The base stations 40, 50, and 120 may be, for example, an eNB specified as a base station compatible with LTE in 3GPP or a Home. evolved Node B (HeNB) specified as a femto base station in 3GPP. The base stations 40, 50, and 120 may be, for example, a Relay Node (RN) used for the purpose of service area expansion or the like.

The core network control device 100 corresponds to the core network node 25 in FIG. 1.
The core network control devices 20 and 100 control handover processing upon the communication terminal 80 moving across cells. The core network control devices 20 and 100 may be, for example, a Mobility Management Entity (MME) specified in 3GPP.

The communication devices 30 and 110 accommodate a plurality of base stations. The communication devices 30 and 110 may be, for example, a HeNB-GW specified as a device that aggregates HeNBs in 3GPP. The communication devices 30 and 110 may be, for example, a Donor eNB (DeNB) specified as a device that aggregates RNs in 3GPP.

The core network control device 20 and the relay devices 15 and 90 correspond to other core network nodes included in the core network including the core network node 25 in FIG. 1. The relay devices 15 and 90 relay, for example, user data transmitted between the communication terminal 80 and another communication terminal, the communication terminal 80 and a server device, or the like. The relay devices 15 and 90 may be, for example, a Serving Gateway (SGW) or a Packet Data Network Gateway (PGW) specified in 3GPP.

Next, the processing behavior of the respective devices will be described. The base station 50 transmits data to be transferred to the base station 120 forming an area of a handover target to the base station 120. The data to be transferred to the base station 120 is data regarding the communication terminal 80 that has occurred during execution of handover processing of the communication terminal 80. Specifically, for example, it may be downlink user data that has not been able to be transmitted to the communication terminal 80, uplink user data of which transmission from the communication terminal 80 has failed, or the like due to handover processing being under way. The base station 50 transmits control information to the core network control device 100. The control information is information indicating whether transfer of data to the base station 120 by the base station 50 is performed with Direct Forwarding or performed with Indirect Forwarding. Indirect Forwarding indicates that the base station 50 transfers data to the base station 120, via the communication device 30, the relay device 15, the relay device 90, and the communication device 110. Direct Forwarding indicates that the base station 50 transfers data to the base station 120, using a communication link set between the base station 50 and the base station 120, i.e., an X2 interface.

The base station 50 transmits control information to the core network control device 100 via the communication device 30 and the core network control device 20, for example.

Next, a configuration example of the core network control device 100 will be described. The core network control device 100 includes a receiving unit 101 and a transmitting unit 102. The core network control device 20 includes a receiving unit 21 and a transmitting unit 22, in a similar manner to the core network control device 100. The core network control device 20 has a configuration similar to the core network control device 100, and therefore detailed description is omitted below.

The receiving unit 101 receives control information transmitted via the communication device 30 and the core network control device 20. The receiving unit 101 outputs the received control information to the transmitting unit 102.

The transmitting unit 102 transmits the control information output from the receiving unit 101 to the communication device 110. The transmitting unit 102 generates a message including the control information with a communication protocol specified between the core network control device 100 and the communication device 110. The transmitting unit 102 transmits the message including the control information to the communication device 110.

Next, a configuration example of the communication device 110 will be described. The communication device 110 includes the receiving unit 111 and the transmitting unit 112. The communication device 30 includes a receiving unit 31 and a transmitting unit 32, in a similar manner to the communication device 110. The communication device 30 has a configuration similar to the communication device 110, and therefore detailed description is omitted below.

The receiving unit 111 receives control information transmitted from the core network control device 100. The receiving unit 111 outputs the received control information to the transmitting unit 112.

The transmitting unit 112 notifies the base station 50 of identification information of the communication device 110 as the destination of data regarding the communication terminal 80 that has occurred during execution of handover processing, in the case where the control information indicates implementation of Indirect Forwarding. The transmitting unit 112 transmits the identification information to the base station 50 via the core network control device 100, the core network control device 20, and the communication device 30.

The transmitting unit 112 notifies the base station 50 of identification information of the base station 120 as the destination of data regarding the communication terminal 80 that has occurred during execution of handover processing, in the case where the control information indicates implementation of Direct Forwarding. The transmitting unit 112 transmits the identification information to the base station 50 via the core network control device 100, the core network control device 20, and the communication device 30.

Figure 2:
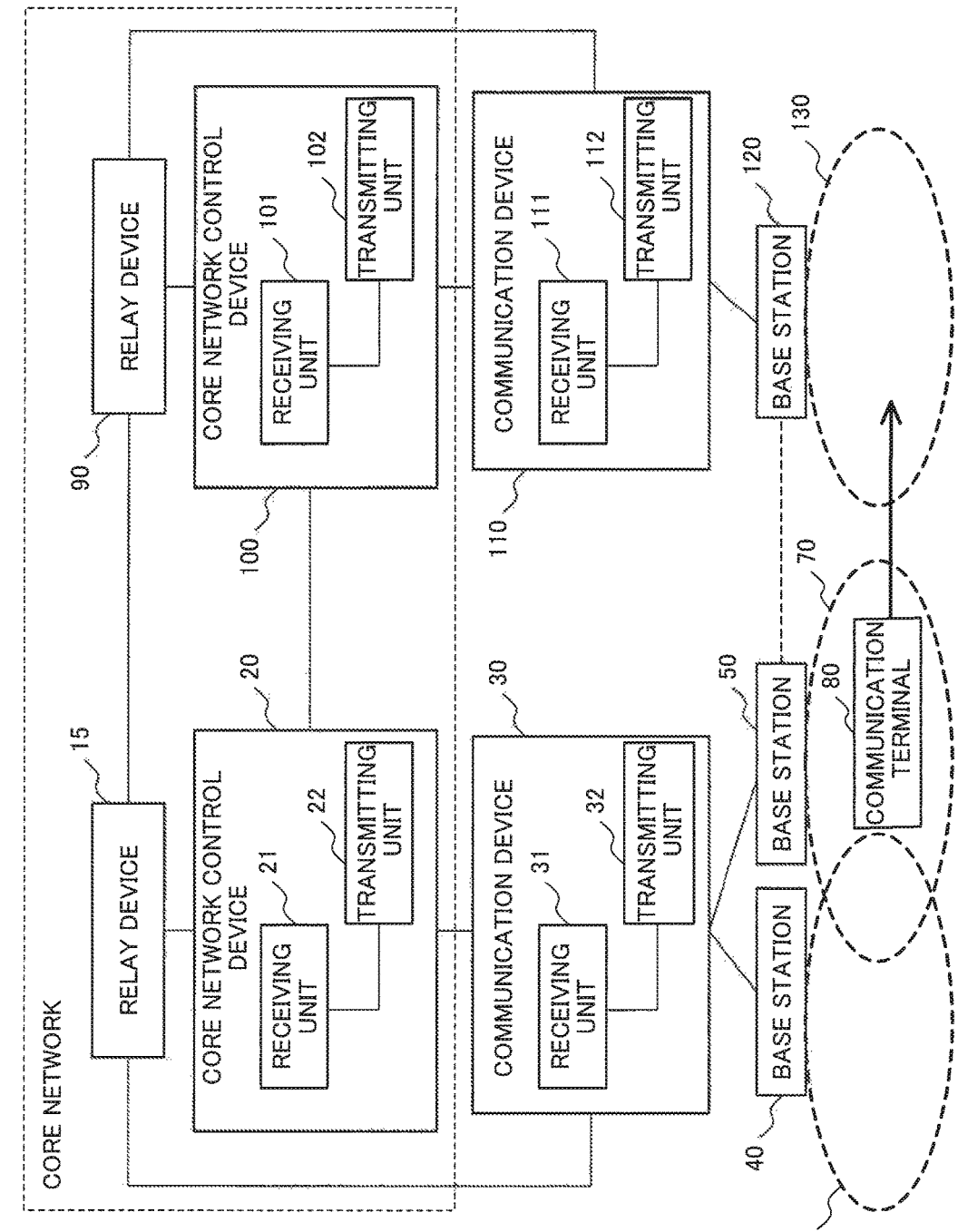
FIG. 2 is a configuration diagram of a mobile communication system according to Exemplary Embodiment 2.

As described above, the communication device 110 in the mobile communication system in FIG. 2 of this exemplary embodiment can receive, via the core network control device 100, information regarding whether the base station 50 implements Indirect Forwarding or implements Direct Forwarding. The communication device 110 is a gateway device accommodating the base station 120 that is a base station of the handover target of the communication terminal 80. The base station 50 is a base station of the handover source of the communication terminal 80.

Therefore, the communication device 110 can notify the base station 50 of appropriate identification information as the destination of data regarding the communication terminal 80 that has occurred during handover processing, in accordance with the type of data forwarding executed by the base station 50.

Accordingly, the communication device 110 can be prevented from notifying the base station 50 of its own identification information, in the case where the base station 50 is planning to implement Direct Forwarding, for example.

If in case the communication device 110 notifies the base station 50 of its own identification information, in the case where the base station 50 is planning to implement Direct Forwarding, there is a possibility that data forwarding fails. Alternatively, in such a case, the base station 50 is caused to transmit data via the relay devices 15 and 90, causing use of extra communication resources within the core network. Further, in such a case, the communication devices 30 and 110 are caused to execute transfer processing (forwarding processing) of data. Therefore, the data processing capabilities in the communication devices 30 and 110 are consumed, causing an increase in data transfer delay.

If in case the communication device 110 notifies the base station 50 of identification information of the base station 120, in the case where the base station 50 is planning to implement Indirect Forwarding, there is a possibility that data forwarding fails. In such a case, the independence of an address space on the core network control device 20 or relay device 15 side to be used for forwarding data and an address space on the base station 50 side decreases, causing the advantage of installing the communication device 30 to be lost.

The communication device 110 can notify the base station 50 of appropriate identification information as the destination of data regarding the communication terminal 80 that has occurred during handover processing, in accordance with the type of data forwarding executed by the base station 50. Therefore, the issue described above can be prevented.

In this exemplary embodiment, control information indicating whether Indirect Forwarding is implemented or Direct Forwarding is implemented is with respect to the communication device 110 from the core network control device 100. However, this is not limiting. For example, the core network control device 100 may transmit, as the control information, information indicating whether an X2 interface is formed between the base station 40 and the base station 50 with respect to the communication device 110. The communication device 110 may determine that Direct Forwarding is implemented, in the case where control information indicating that an X2 interface is formed between the base station 40 and the base station 50 has been received.

(Exemplary Embodiment 3)

Figure 3:
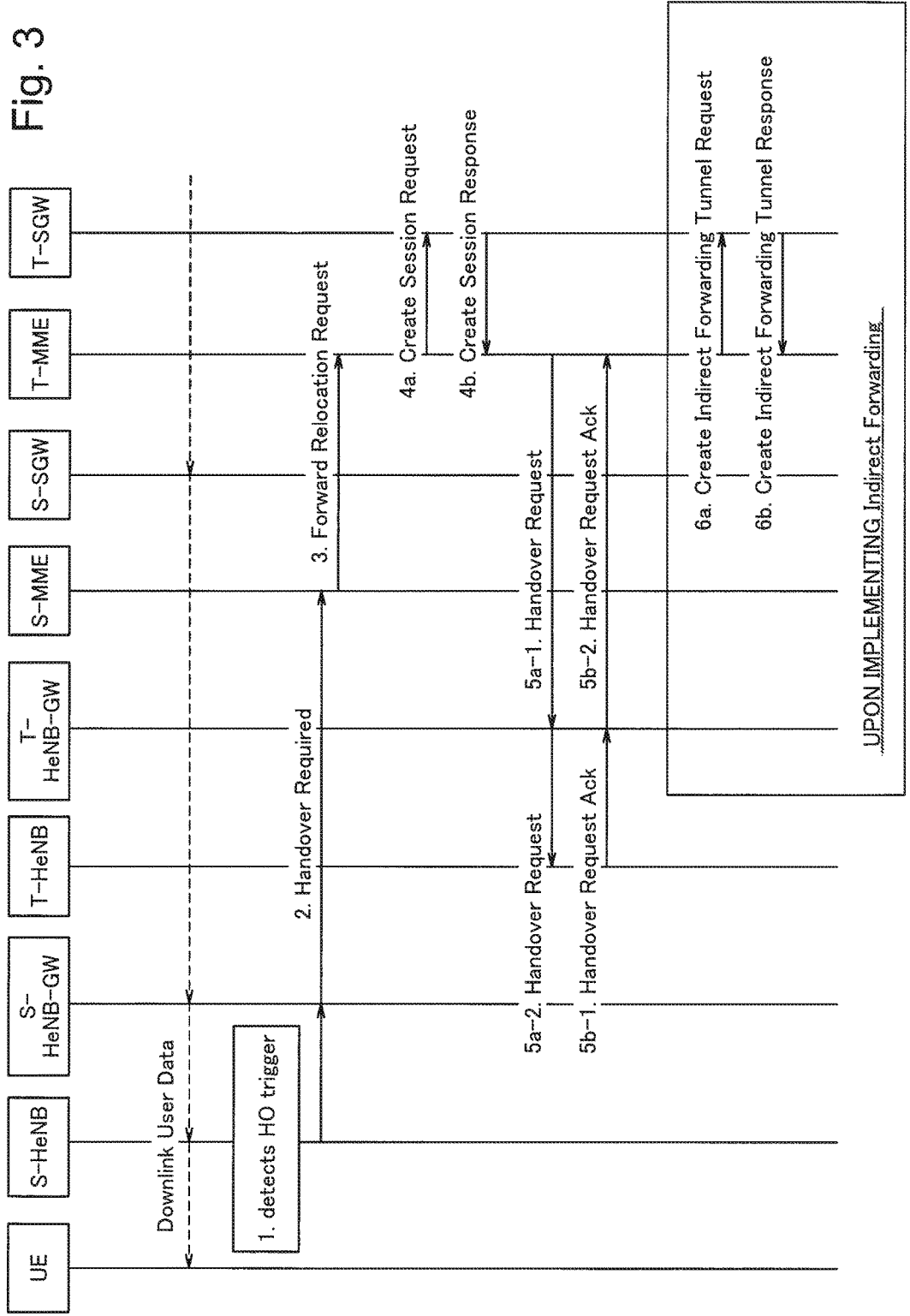
FIG. 3 is a diagram illustrating the flow of signal processing according to Exemplary Embodiment 3.
Figure 4:
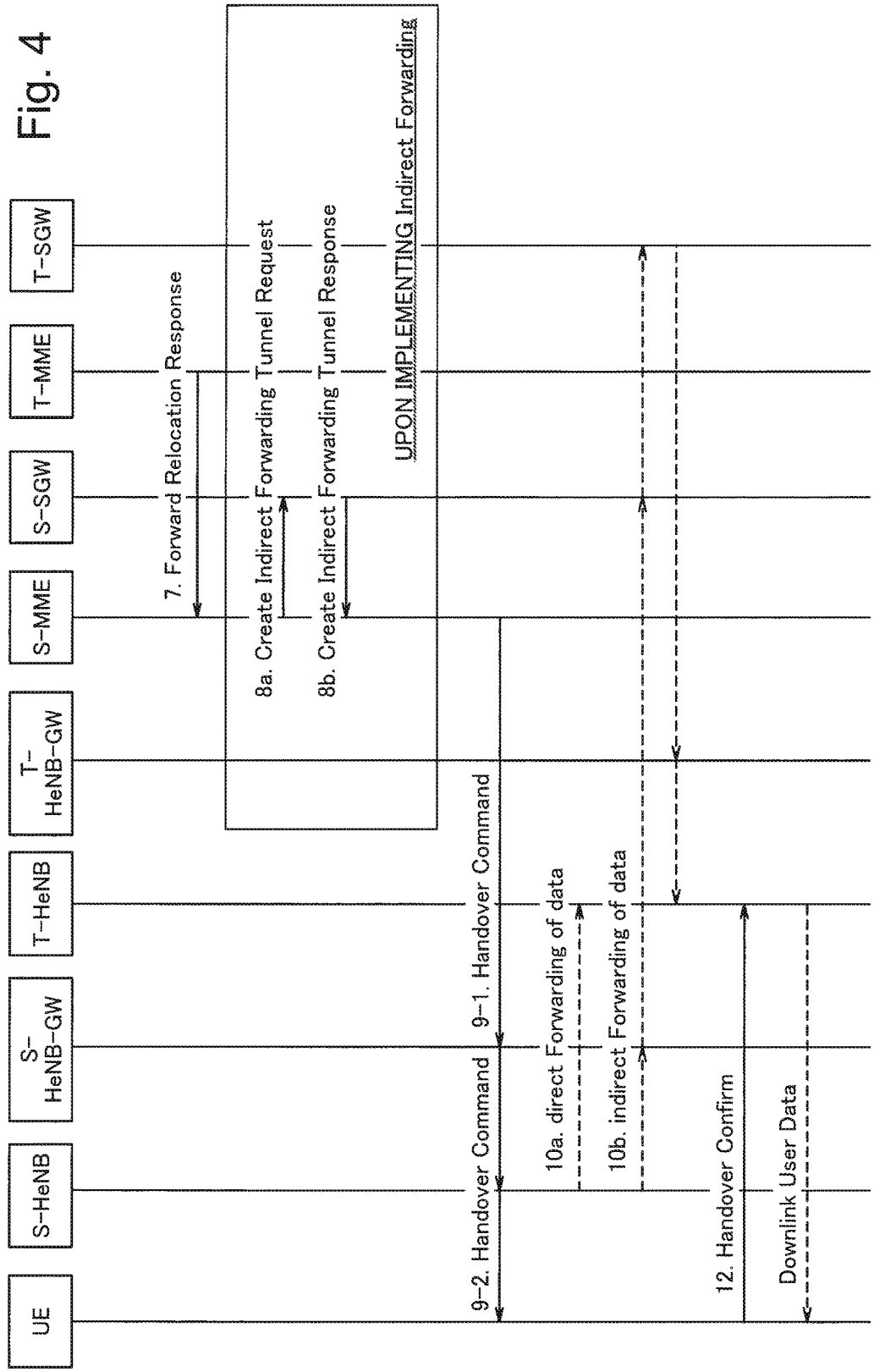
FIG. 4 is a diagram illustrating the flow of signal processing according to Exemplary Embodiment 3.

Next, using FIG. 3 and FIG. 4, the flow of signal processing according to Exemplary Embodiment 3 will be described. In FIG. 3 and FIG. 4, the flow of signal processing in a mobile communication system specified in 3GPP will be described. For FIG. 3 and FIG. 4, description will be given specifically, with the communication terminal 80 in FIG. 2 as UE 8, the base station 50 as an S-HeNB 5, the communication device 30 as an S-HeNB-GW 3, the core network control device 20 as an S-MME 2, the relay device 15 as an S-SGW 1, the relay device 90 as a T-SGW 9, the core network control device 100 as a T-MME 10, the communication device 110 as a T-HeNB-GW 11, and the base station 120 as a T-HeNB 12, in a similar manner to FIG. 19.

The communication devices 30 and 110 may be a gateway device accommodating a base station that forms a small cell, picocell, microcell, or the like, instead of a HeNB-GW accommodating a HeNB. The communication devices 30 and 110 may be not only a gateway device arranged in a bureau, but also a gateway device installed in a company.

In this diagram, the UE 8 receives Downlink User Data via the S-SGW 1, the S-HeNB-GW 3, and the S-HeNB 5.

First, in step 1, the S-HeNB 5 detects that the UE 8 is in a state of conducting a handover to another cell. For example, the S-HeNB 5 detects that the UE 8 is in a state of conducting a handover to another cell, in the case where the UE 8 has made a notification to execute a handover to another cell based on the radio wave condition or the like.

Next, in step 2, the S-HeNB 5 transmits an S1AP: Handover Required message requesting execution of handover processing of the UE 8 to the S-HeNB-GW 3. Further, the S-HeNB-GW 3 transmits the received S1AP: Handover Required message to the S-MME 2. The S-HeNB 5 sets a Direct Forwarding Path Availability IE and a Target HeNB ID into the S1AP: Handover Required message. The Direct Forwarding Path Availability IE is information indicating whether Direct Forwarding is implemented or Indirect Forwarding is implemented. The Target HeNB ID is identification information of a HeNB (e.g., the T-HeNB 12) that forms an area of destination of the UE.

Next, in step 3, the S-MME 2 transmits a GTPv2-C: Forward Relocation Request message notifying that the handover is conducted by the UE 8, to the T-MME 10 managing the UE 8 in a cell of a handover target. The S-MME 2 sets the value of Direct Forwarding Indication into Indication Flags IE of the GTPv2-C: Forward Relocation Request message. In the Direct Forwarding Indication, "1" is set in the case of implementing Direct Forwarding and "0" is set in the case of implementing Indirect Forwarding with the S-HeNB 5, for example.

Next, in step 4a, the T-MME 10 transmits a Create Session Request message to the T-SGW 9, in order to set the communication path between the T-SGW 9 and the T-HeNB-GW 11. Next, in step 4b, the T-SGW 9 transmits a Create Session Response message to the T-MME 10. The T-SGW 9 sets an Internet Protocol (IP) address and a Tunnel Endpoint Identifier (TEID) regarding the T-SGW 9 into the Create Session Response message. The TEID is information identifying the destination of a GTP tunnel used upon exchange of data. The TEID of the T-SGW 9 is information identifying the destination on the T-SGW 9 side of a General packet radio service (GPRS) Tunneling Protocol (GTP) tunnel set between the T-SGW 9 and the T-HeNB-GW 11.

Next, in step 5a-1, the T-MME 10 transmits an S1AP: Handover Request message instructing execution of the handover processing regarding the UE 8 to the T-HeNB-GW 11. The T-MME 10 sets the IP address and the TEID regarding the T-SGW 9 and the Direct Forwarding Path Availability IE into the S1AP: Handover Request message.

Next, in step 5a-2, the T-HeNB-GW 11 transmits an S1AP: Handover Request message instructing execution of the handover processing of the UE 8 to the T-HeNB 12. The T-HeNB-GW 11 sets an IP address and a TEID regarding the T-HeNB-GW 11 into the S1AP: Handover Request message.

Next, in step 5b-1, the T-HeNB 12 transmits an S1AP: Handover Request Ack message to the T-HeNB-GW 11, as a response message to the S1AP: Handover Request message. The T-HeNB 12 sets an IP address and a TEID regarding the T-HeNB 12 into the S1AP: Handover Request Ack message.

Next, in step 5b-2, the T-HeNB-GW 11 transmits an S1AP: Handover Request Ack message to the T-MME 10, as a response message to the S1AP: Handover Request message. In the case where the Direct Forwarding Path Availability IE indicating implementation of Direct Forwarding has been set in the S1AP: Handover Request message in step 5a-1, the T-HeNB-GW 11 sets the IP address and the TEID regarding the T-HeNB 12 into the S1AP: Handover Request Ack message. In the case where the Direct Forwarding Path Availability IE indicating implementation of Indirect Forwarding has been set in the S1AP: Handover Request message received in step 5a-1, the T-HeNB-GW 11 performs the following processing in step 5b-2. That is, the T-HeNB-GW 11 converts the IP address and the TEID regarding the T-HeNB 12 set in the S1AP: Handover Request Ack message received in step 5b-1 to the IP address and the TEID regarding the T-HeNB-GW 11. The Handover Request Ack message in which such conversion has been performed is transmitted to the T-MME 10.

In the case where the Direct Forwarding Path Availability IE indicating implementation of Indirect Forwarding has been set in the S1AP: Handover Request message received in step 5a-1, it is necessary to form a tunnel used upon data transfer by Indirect Forwarding with respect to the T-HeNB 12 from the S-HeNB 5. The tunnel is formed by steps 6a and 6b described next and steps 8a and 8b. That is, in step 6a, in the case of implementing Indirect Forwarding, the T-MME 10 transmits a Create Indirect Forwarding Tunnel Request message to the T-SGW 9. Further, in step 6b, the T-SGW 9 transmits a Create Indirect Forwarding Tunnel Response message to the T-MME 10. By implementing steps 6a and 6b, the GTP tunnel upon implementing Indirect Forwarding is set between the T-SGW 9 and the T-HeNB-GW 11. In the case of implementing Direct Forwarding, steps 6a and 6b are omitted.

Next, in step 7, the T-MME 10 transmits a GTPv2-C: Forward Relocation Response message to the S-MME 2, as a response signal with respect to the GTPv2-C: Forward Relocation Request message in step 3.

Next, in step 8a, in the case of implementing Indirect Forwarding, the S-MME 2 transmits a Create Indirect Forwarding Tunnel Request message to the S-SGW 1. Further, in step 8b, the S-SGW 1 transmits a Create Indirect Forwarding Tunnel Response message to the S-MME 2. By implementing steps 8a and 8b, a GTP tunnel upon implementing Indirect Forwarding is set between the S-SGW 1 and the S-HeNB-GW 3. In the case of implementing Direct Forwarding, steps 8a and 8b are omitted.

Next, in step 9-1, the S-MME 2 transmits a Handover Command message instructing execution of the handover processing of the UE 8 to the S-HeNB-GW 3. In the case where the Direct Forwarding Path Availability IE indicating implementation of Direct Forwarding has been set in the S1AP: Handover Required message in step 2, the S-MME 2 sets the IP address and the TEID regarding the T-HeNB 12 into the Handover Command message.

In the case where the Direct Forwarding Path Availability IE indicating implementation of Indirect Forwarding has been set in the S1AP: Handover Required message in step 2, the S-MME 2 sets an IP address and a TEID regarding the S-SGW 1 into the Handover Command message.

Next, in step 9-2, the S-HeNB-GW 3 transmits a Handover Command message instructing execution of the handover processing of the UE 8 to the S-HeNB 5. In the case where the Direct Forwarding Path Availability IE indicating implementation of Direct Forwarding has been set in the S1AP: Handover Required message in step 2, the S-HeNB-GW 3 sets the IP address and the TEID regarding the T-HeNB 12 into the Handover Command message. In the case where the Direct Forwarding Path Availability IE indicating implementation of Indirect Forwarding has been set in the S1AP: Handover Required message in step 2, the S-HeNB-GW 3 sets an IP address and a TEID regarding the S-HeNB-GW 3 into the Handover Command message.

Next, in step 10a, in the case of implementing Direct Forwarding, the S-HeNB 5 transmits data directly to the T-HeNB 12. In step 10b, in the case of implementing Indirect Forwarding, the S-HeNB 5 transmits data to the T-HeNB 12 via the S-HeNB-GW 3, the S-SGW 1, the T-SGW 9, and the T-HeNB-GW 11. In accordance with the type of data forwarding, step 10a or step 10b is executed.

Next, in step 12, the UE 8 transmits a Handover Confirm message to the T-HeNB 12, upon completion of the handover processing. Thereafter, the T-HeNB 12 transmits Downlink User Data with respect to the UE 8.

In step 5a-1, it has been described that the T-MME 10 sets the Direct Forwarding Path Availability IE in the S1AP: Handover Request message. However, a parameter different from the Direct Forwarding Path Availability IE may be set. For example, the T-MME 10 may cause information regarding whether Direct Forwarding is implemented or Indirect Forwarding is implemented to be included in a Source to Target Transparent Container IE of the S1AP: Handover Request message. The T-MME 10 may show information regarding whether Direct Forwarding is implemented or Indirect Forwarding is implemented, using the GTP protocol, for example, other than the S1AP protocol.

Figure 5:
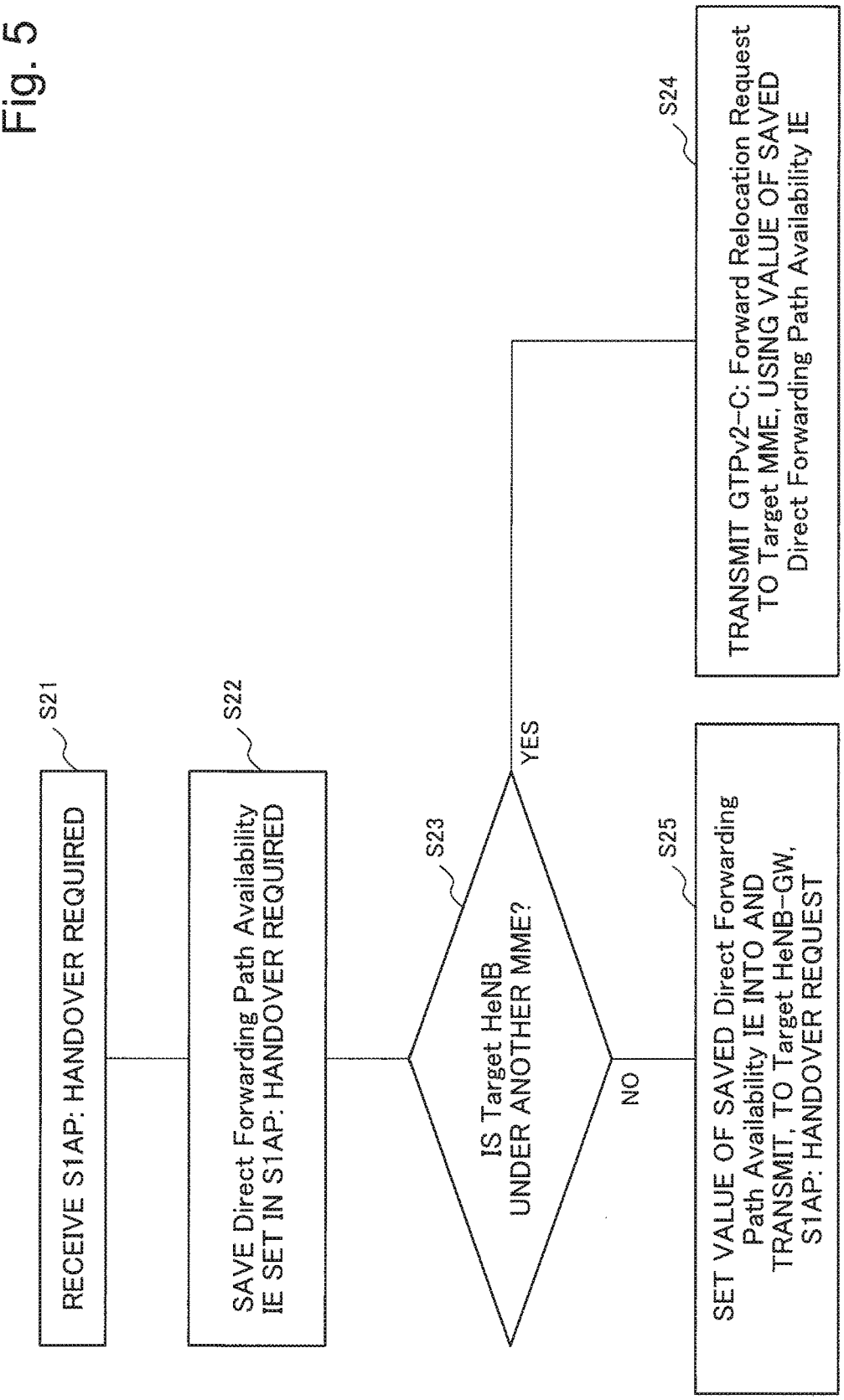
FIG. 5 is a diagram illustrating the flow of handover processing in an MME according to Exemplary Embodiment 3.

Next, using FIG. 5, the flow of handover processing executed by the S-MME 2 will be described. First, the receiving unit 21 of the S-MME 2 receives the S1AP: Handover Required message transmitted from the S-HeNB-GW 3 (S21). Next, the receiving unit 21 of the S-MME 2 saves the Direct Forwarding Path Availability IE set in the S1AP: Handover Required message (S22). For example, the receiving unit 21 saves the Direct Forwarding Path Availability IE into a memory device provided inside the S-MME 2, an external memory device, or the like.

Next, the transmitting unit 22 of the S-MME 2 determines whether the Target HeNB ID set in the S1AP: Handover Required message is present under another MME different from the S-MME 2 (S23). In the case where the Target HeNB ID is determined to be present under another MME, the transmitting unit 22 of the S-MME 2 sets the value of the saved Direct Forwarding Path Availability IE into the GTPv2-C: Forward Relocation Request message and transmits the GTPv2-C: Forward Relocation Request message to the T-MME 10 (S24).

In the case where the Target HeNB ID is determined to be not present under another MME, i.e., to be present under the S-MME 2, the transmitting unit 22 of the S-MME 2 sets the value of the saved Direct Forwarding Path Availability IE into the S1AP: Handover Required message and transmits the S1AP: Handover Required message to the T-HeNB-GW 11 accommodating the T-HeNB 12 (S25).

Figure 6:
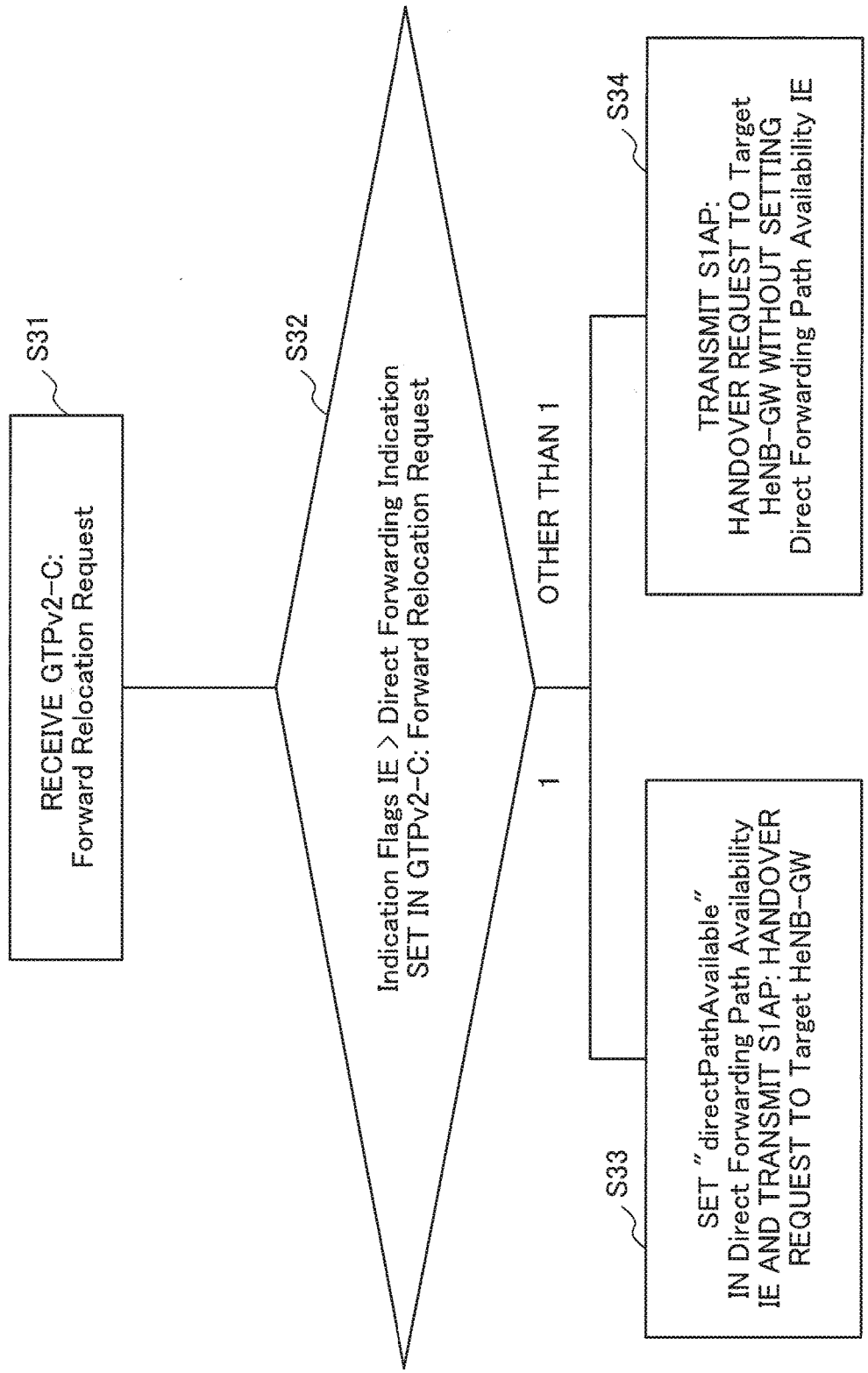
FIG. 6 is a diagram illustrating the flow of handover processing in an MME according to Exemplary Embodiment 3.

Next, using FIG. 6, the flow of handover processing executed by the T-MME 10 will be described. First, the receiving unit 101 of the T-MME 10 receives the GTPv2-C: Forward Relocation Request message transmitted from the S-MME 2 (S31).

Next, the transmitting unit 102 of the T-MME 10 determines the value of the Direct Forwarding Indication of the Indication Flags IE set in the GTPv2-C: Forward Relocation Request message (S32).

If the value of the Direct Forwarding Indication is 1, the transmitting unit 102 of the T-MME 10 sets directPathAvailable into the Direct Forwarding Path Availability IE of the S1AP: Handover Request message and transmits the S1AP: Handover Request message to the T-HeNB-GW 11 (S33).

If the value of the Direct Forwarding Indication is other than 1, e.g., 0, the transmitting unit 102 of the T-MME 10 transmits the S1AP: Handover Request message to the T-HeNB-GW 11, without setting directPathAvailable into the Direct Forwarding Path Availability IE of the S1AP: Handover Request message (S34). Alternatively, if the value of the Direct Forwarding Indication is other than 1, the transmitting unit 102 of the T-MME 10 may set information indicating implementation of Indirect Forwarding into the Direct Forwarding Path Availability IE of the S1AP: Handover Request message.

Using FIG. 7, the S1AP: Handover Request message transmitted to the T-HeNB-GW 11 from the T-MME 10 will be described.

FIG. 7 shows that Direct Forwarding Path Availability is included in IEs of the S1AP: Handover Request message. Further, it is shown that values of Direct Path Available and the like are set in the Direct Forwarding Path Availability IE.

Next, using FIG. 8, the flow of handover processing executed by the T-HeNB-GW 11 will be described. First, the receiving unit 111 of the T-HeNB-GW 11 receives the S1AP: Handover Request message transmitted from the T-MME 10 (S41). Next, the receiving unit 111 of the T-HeNB-GW 11 saves the Direct Forwarding Path Availability IE set in the S1AP: Handover Request message (S42).

Next, the transmitting unit 112 of the T-HeNB-GW 11 transmits the S1AP: Handover Request message to the T-HeNB 12 (S43). Next, the receiving unit 111 of the T-HeNB-GW 11 receives the S1AP: Handover Request Ack message transmitted from the T-HeNB 12 as the response signal to the S1AP: Handover Request message (S44). Next, the transmitting unit 112 of the T-HeNB-GW 11 determines the value of the Direct Forwarding Path Availability IE saved in step S42 (S45).

If directPathAvailable is set in the Direct Forwarding Path Availability IE, the transmitting unit 112 of the T-HeNB-GW 11 transfers the S1AP: Handover Request Ack message transmitted from the T-HeNB 12 as is to the T-MME 10 (S46).

In the case where directPathAvailable is not set or information indicating implementation of Indirect Forwarding is set in the Direct Forwarding Path Availability IE, the transmitting unit 112 of the T-HeNB-GW 11 converts and transfers, to the T-MME 10, the content of the S1AP: Handover Request Ack message transmitted from the T-HeNB 12. Specifically, the transmitting unit 112 of the T-HeNB-GW 11 converts ERABs Admitted List>E-RABs Admitted Item IEs>>DL Transport Layer Address, DL GTP-TEID, UL Transport Layer Address, UL GTP-TEID of the S1AP: Handover Request Ack message to the IP address and the TEID of the T-HeNB-GW 11 and transfers the S1AP: Handover Request Ack message to the T-MME 10 (S47).

By using the mobile communication system according to Exemplary Embodiment 3, as described above, the T-MME 10 can transmit, to the T-HeNB-GW 11, the S1AP: Handover Request message set with the Direct Forwarding Path Availability IE indicating whether Direct Forwarding is implemented or Indirect Forwarding is implemented. Accordingly, the T-HeNB-GW 11 can determine whether the S-HeNB 12 implements Direct Forwarding or implements Indirect Forwarding. Therefore, the T-HeNB-GW 11 can set and notify the S-HeNB 5 of an appropriate destination as the forwarding target of data, in accordance with the type of forwarding for the S-HeNB 5.

(Exemplary Embodiment 4)

Figure 9:
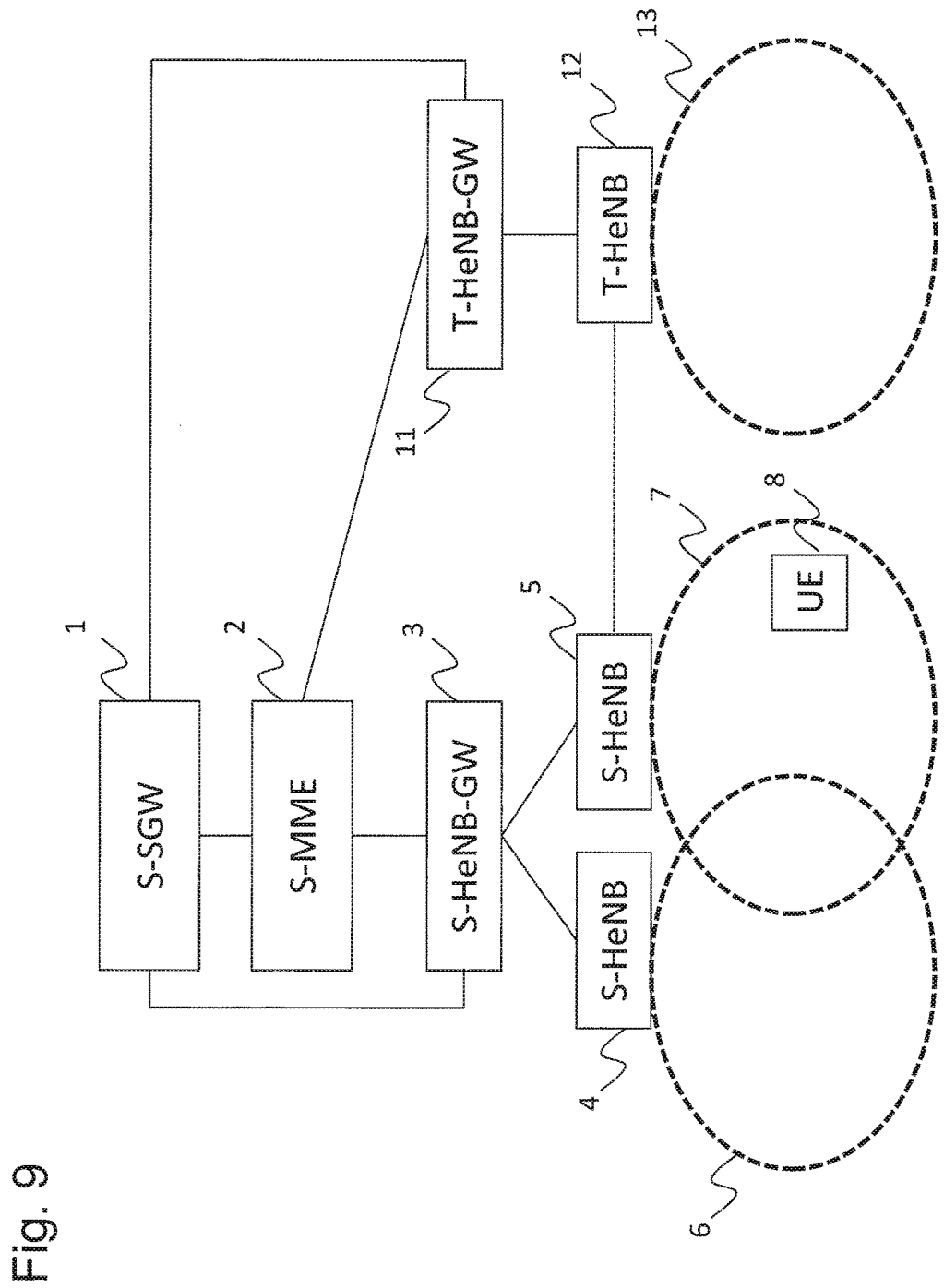
FIG. 9 is a configuration diagram of a mobile communication system according to Exemplary Embodiment 4.

Next, using FIG. 9 to FIG. 16, configuration examples of a mobile communication system according to Exemplary Embodiment 4 that are modified examples of Exemplary Embodiment 3 will be described. In this exemplary embodiment, the mobile communication system shown in FIG. 9 to FIG. 16 may be applied. In Exemplary Embodiment 3, the configuration in which the mobile communication system includes the S-MME 2, the T-MME 10, the S-SGW 1, and the T-SGW 9 has been described. However, FIG. 9 shows a configuration in which the T-HeNB-GW 11 is connected to the S-SGW 1 and the S-MME 2. In the configuration of this diagram, exchange of a GTPv2-C: Forward Relocation Request message and a GTPv2-C: Forward Relocation Response message between the S-MME 2 and the T-MME 10 is omitted. In this diagram, the S-MME 2 transmits an S1AP: Handover Request message set with a Direct Forwarding Path Availability IE to the T-HeNB-GW 11.

Figure 10:
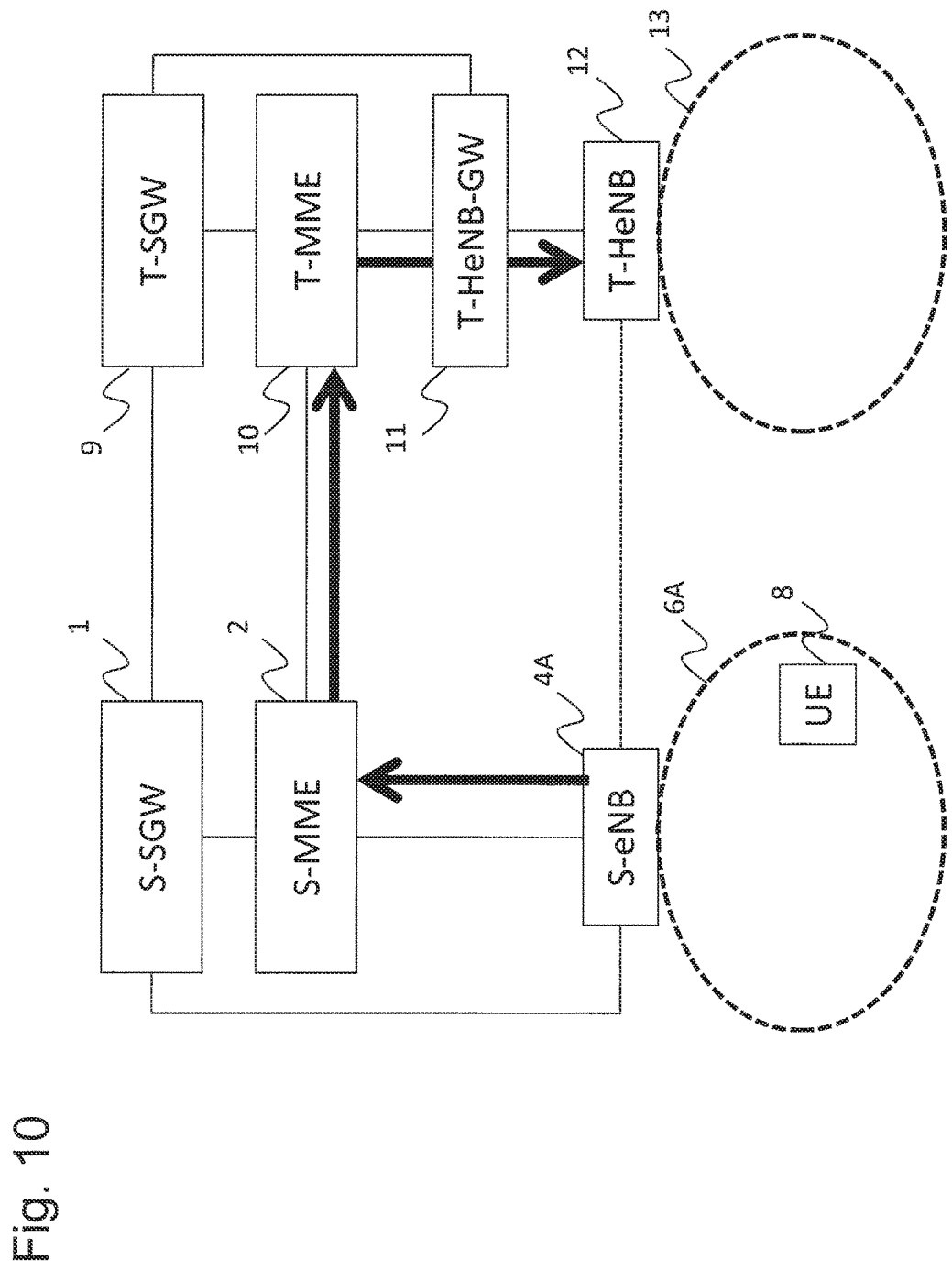
FIG. 10 is a configuration diagram of a mobile communication system according to Exemplary Embodiment 4.

Next, using FIG. 10, the configuration example of the mobile communication system that is the modified example will be described. This diagram shows the configuration example of the mobile communication system in the case of conducting a handover to a cell 13 formed by the T-HeNB 12 under the T-HeNB-GW 11 from a cell 6A formed by an S-eNB 4A. In this diagram, the S-eNB 4A exchanges an S1AP: Handover Required message or the like directly with the S-MME 2, without involving a gateway device.

Figure 11:
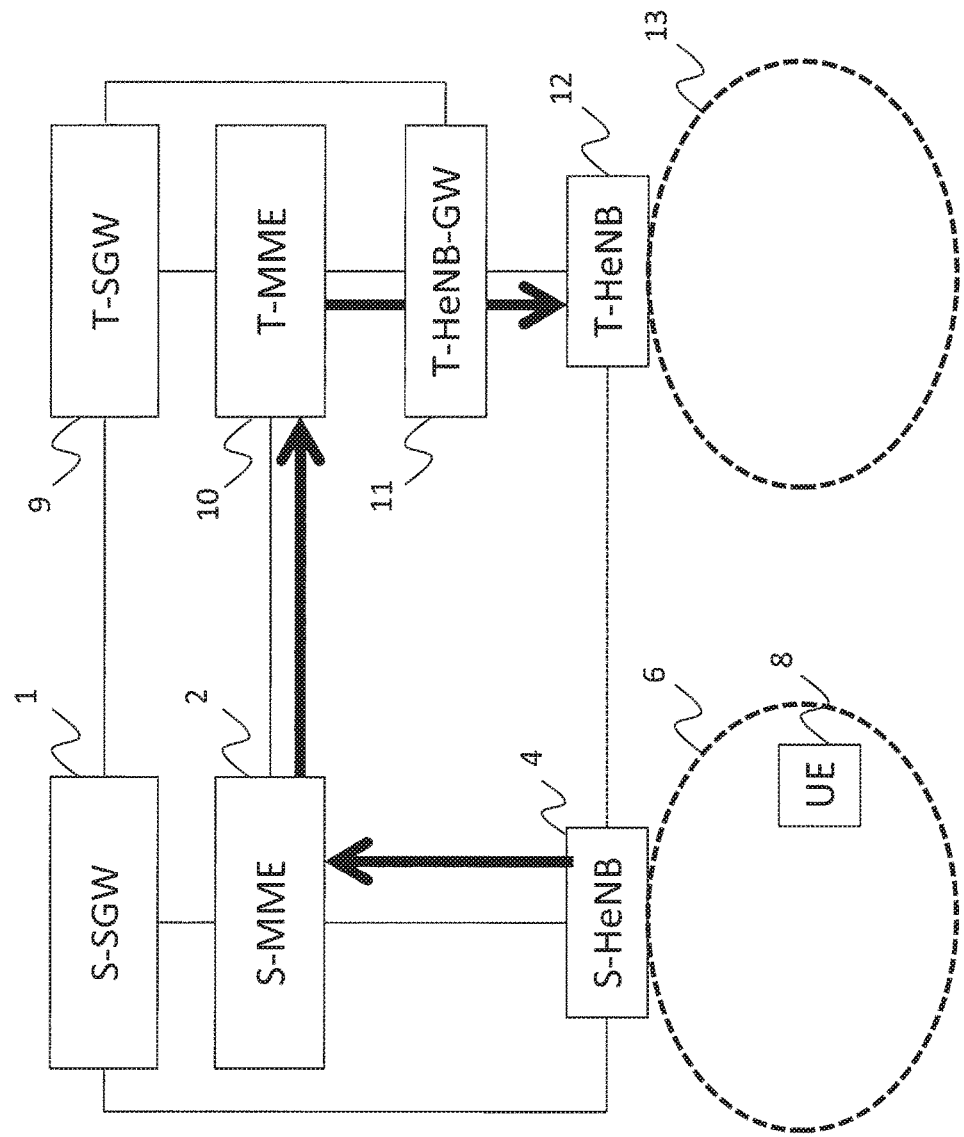
FIG. 11 is a configuration diagram of a mobile communication system according to Exemplary Embodiment 4.

Next, using FIG. 11, the configuration example of the mobile communication system that is the modified example will be described. This diagram shows the configuration example in which the S-HeNB-GW 3 is not included. That is, an S-HeNB 4 is accommodated directly in the S-MME 2, without involving the S-HeNB-GW 3. In this diagram, the S-HeNB 4 exchanges an S1AP: Handover Required message or the like directly with the S-MME 2, without involving a gateway device.

Next, using FIG. 12, the configuration example of the mobile communication system that is the modified example will be described. This diagram shows a configuration in which a Relay Node (RN) 41 and a Donor eNB (DeNB) 35 are used in place of the S-HeNB 4 and the S-HeNB-GW 3. The RN 41 is a node device installed to extend from the DeNB 35, in order to expand the service area, i.e., communication coverage, of the DeNB 35. That is, the RN 41 and the DeNB 35 are arranged in distant positions, and an optical fiber network or the like, for example, may be used for connection between the RN 41 and the DeNB 35.

Figure 12:
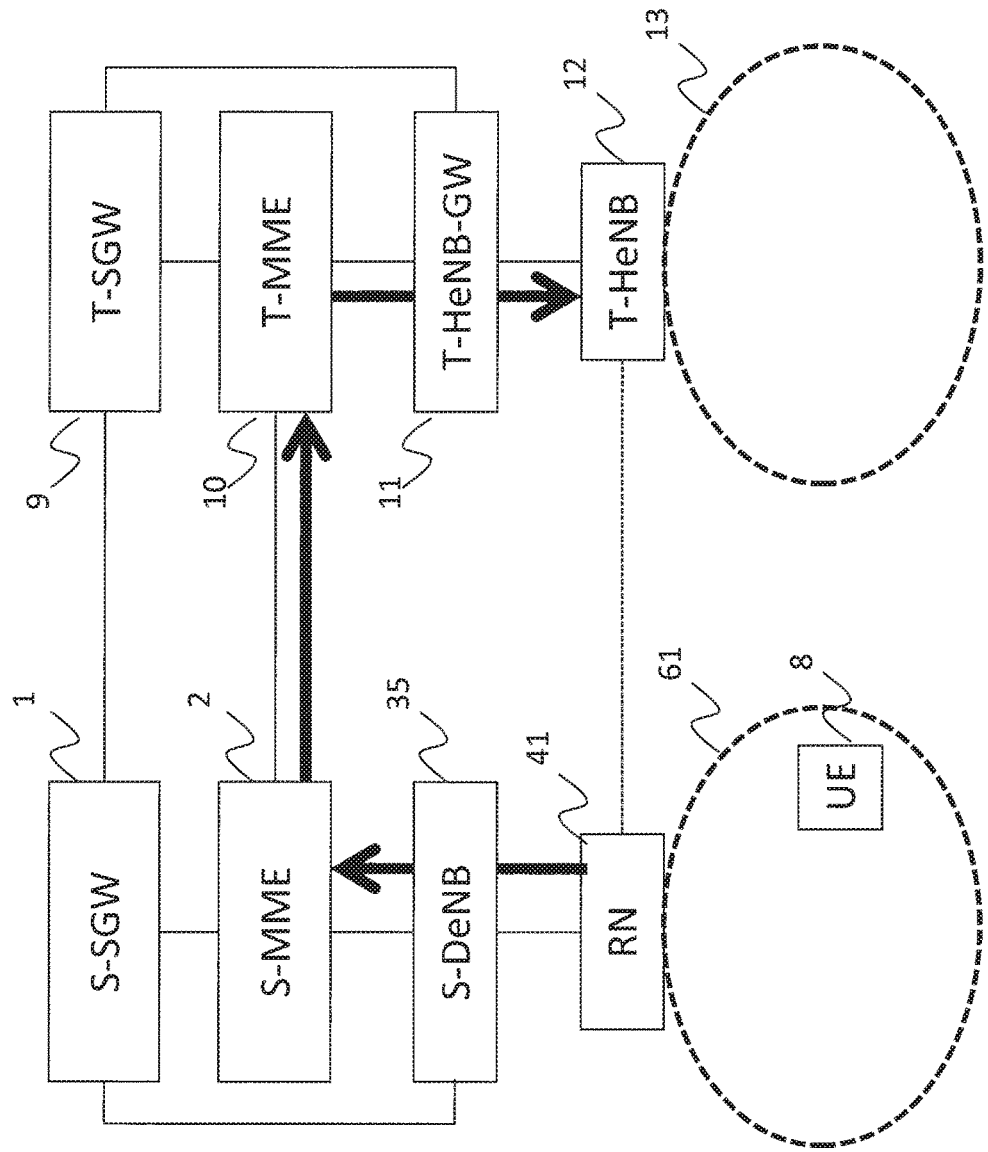
FIG. 12 is a configuration diagram of a mobile communication system according to Exemplary Embodiment 4.
Figure 13:
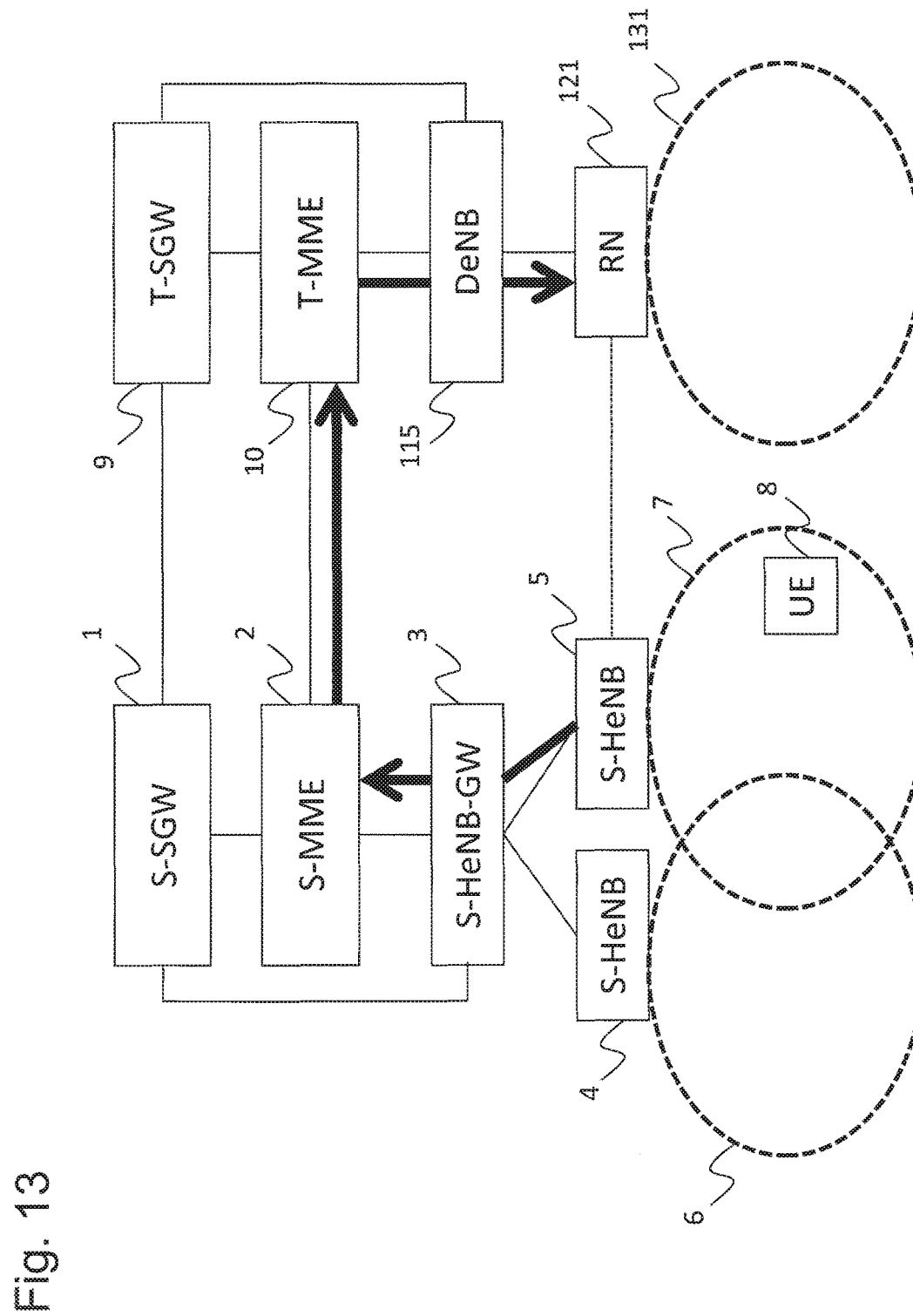
FIG. 13 is a configuration diagram of a mobile communication system according to Exemplary Embodiment 4.
Figure 14:
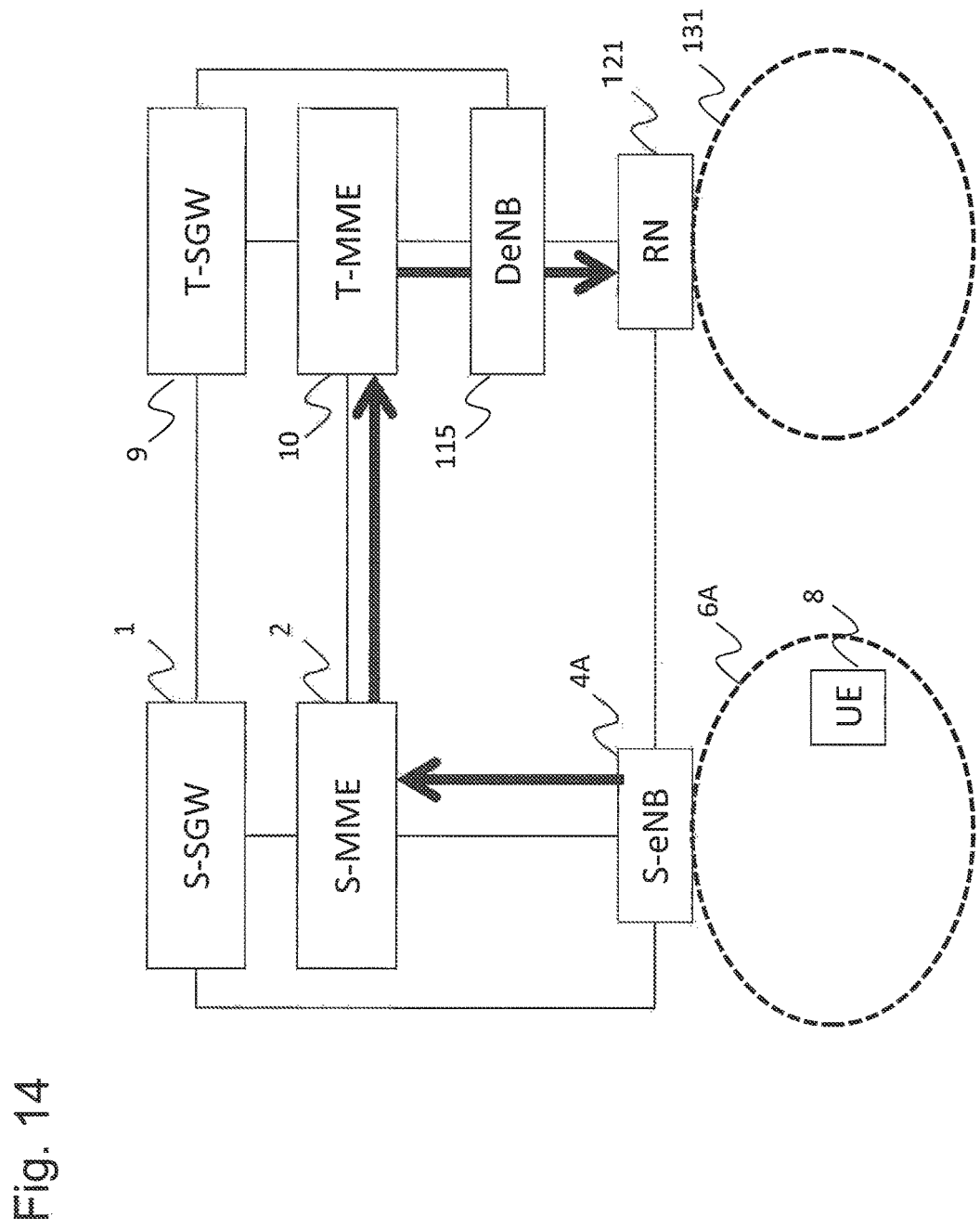
FIG. 14 is a configuration diagram of a mobile communication system according to Exemplary Embodiment 4.
Figure 15:
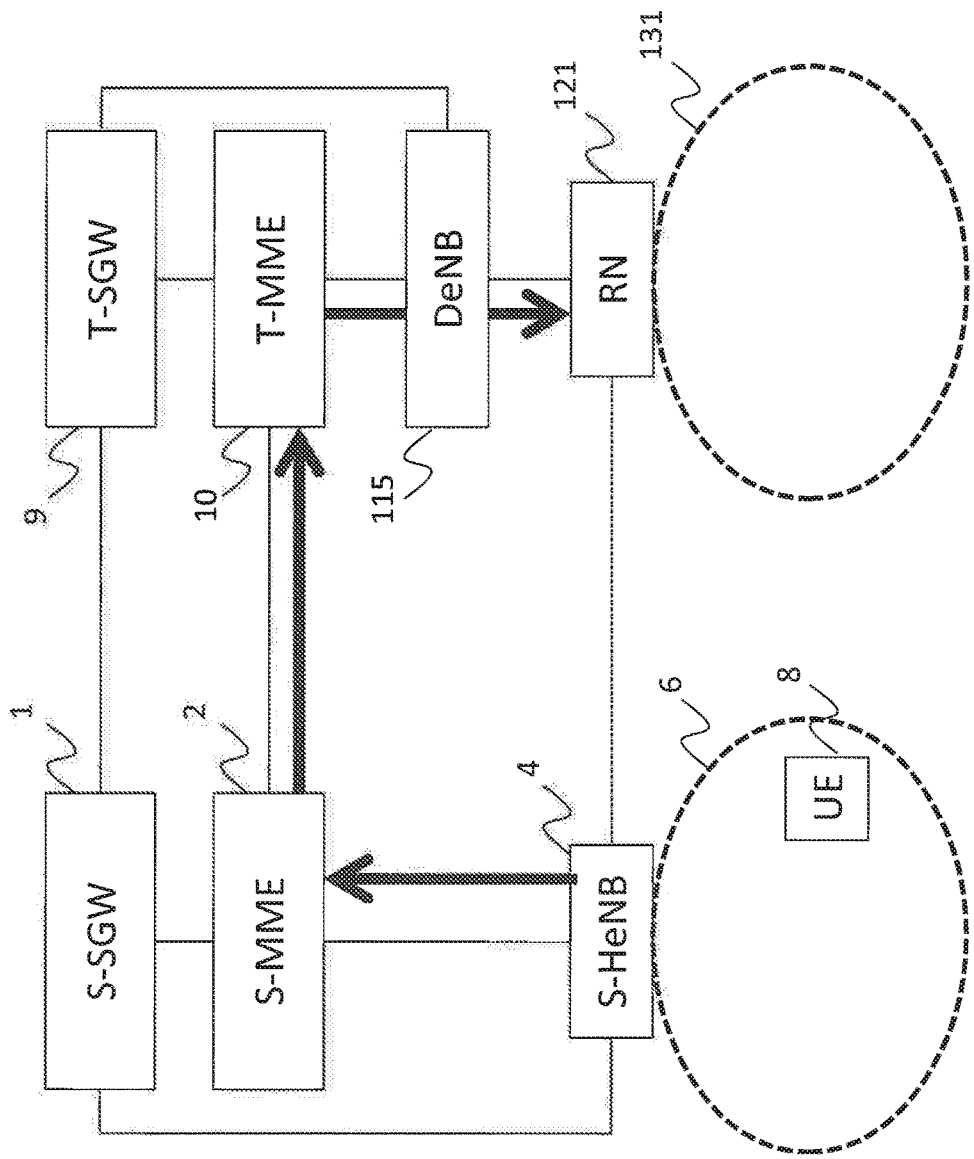
FIG. 15 is a configuration diagram of a mobile communication system according to Exemplary Embodiment 4.
Figure 16:
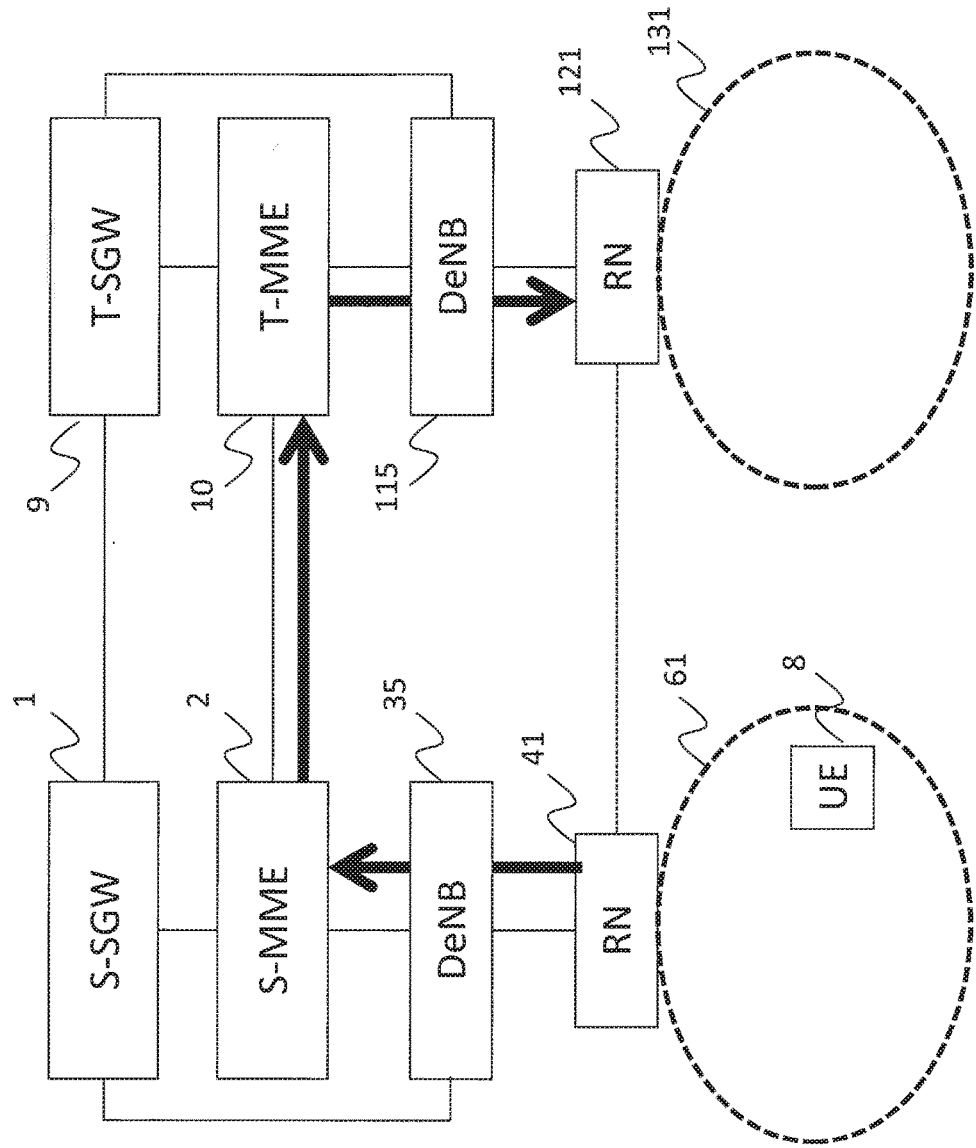
FIG. 16 is a configuration diagram of a mobile communication system according to Exemplary Embodiment 4.

Unlike FIG. 12, FIG. 13 shows the configuration example in which an RN 121 and a DeNB 115 are used in place of the T-HeNB 12 and the T-HeNB-GW 11 that are devices of a handover target. FIG. 14 shows the configuration example of the mobile communication system in the case where the UE 8 moves to a cell 131 formed by the RN 121 from the cell 6A formed by the S-eNB 4A. FIG. 15 shows the configuration example of the mobile communication system in the case where the UE 8 moves to the cell 131 formed by the RN 121 from a cell 6 formed by the S-HeNB 4 accommodated directly in the S-MME 2. FIG. 16 discloses the configuration example of the mobile communication system in the case where the UE 8 moves to the cell 131 formed by the RN 121 from a cell 61 formed by the RN 41.

In various mobile communication systems, as described above, a T-HeNB-GW or DeNB can grasp the type of forwarding applied by an S-HeNB, S-eNB, or RN. Therefore, the T-HeNB-GW or DeNB can notify the S-HeNB, S-eNB, or RN of information regarding an appropriate destination, in accordance with the type of forwarding applied by the S-HeNB, S-eNB, or RN.

(Exemplary Embodiment 5)

Next, using FIG. 17, the flow of handover processing in the T-HeNB-GW 11 according to Exemplary Embodiment 5 will be described. Steps S51 to S54 are similar to steps S41 to S44 in FIG. 8, and therefore detailed description is omitted.

In step S55, the transmitting unit 112 of the T-HeNB-GW 11 determines the availability of Direct Forwarding, using a database in which whether the T-HeNB 12 and the S-HeNB 5 to perform data forwarding can use Direct Forwarding is set. For example, in the case where TRUE is set in the setting value of the S-HeNB 5 in the database, the transmitting unit 112 of the T-HeNB-GW 11 determines that Direct Forwarding can be implemented between the S-HeNB 5 and the T-HeNB 12 and transfers the S1AP: Handover Request Ack message transmitted from the T-HeNB 12 as is to the T-MME 10 (S56).

For example, in the case where FALSE is set in the setting value of the S-HeNB 5 in the database, the transmitting unit 112 of the T-HeNB-GW 11 determines that Direct Forwarding cannot be implemented between the S-HeNB 5 and the T-HeNB 12, i.e., Indirect Forwarding is implemented, and converts and transfers, to the T-MME 10, the content of the S1AP: Handover Request Ack message transmitted from the T-HeNB 12. Specifically, the transmitting unit 112 of the T-MME 10 converts ERABs Admitted List>E-RABs Admitted Item IEs>>DL Transport Layer Address, DL GTP-TEID, UL Transport Layer Address, UL GTP-TEID of the S1AP: Handover Request Ack message to an IP address and a TEID of the T-HeNB-GW 11 and transfers the S1AP: Handover Request Ack message to the T-MME 12 (S57).

The database may specify a setting value regarding the availability of Direct Forwarding, with respect to a combination of an S-HeNB ID and a T-HeNB ID, as shown in FIG. 18, for example.

Further, for information regarding the availability of Direct Forwarding, an O&M system of a HeNB may coordinate with an O&M system of a HeNB-GW, such that information regarding the availability of Direct Forwarding that is held by the O&M system of the HeNB is acquired and set in the database described above by the O&M system of the HeNB-GW.

Figure 17:
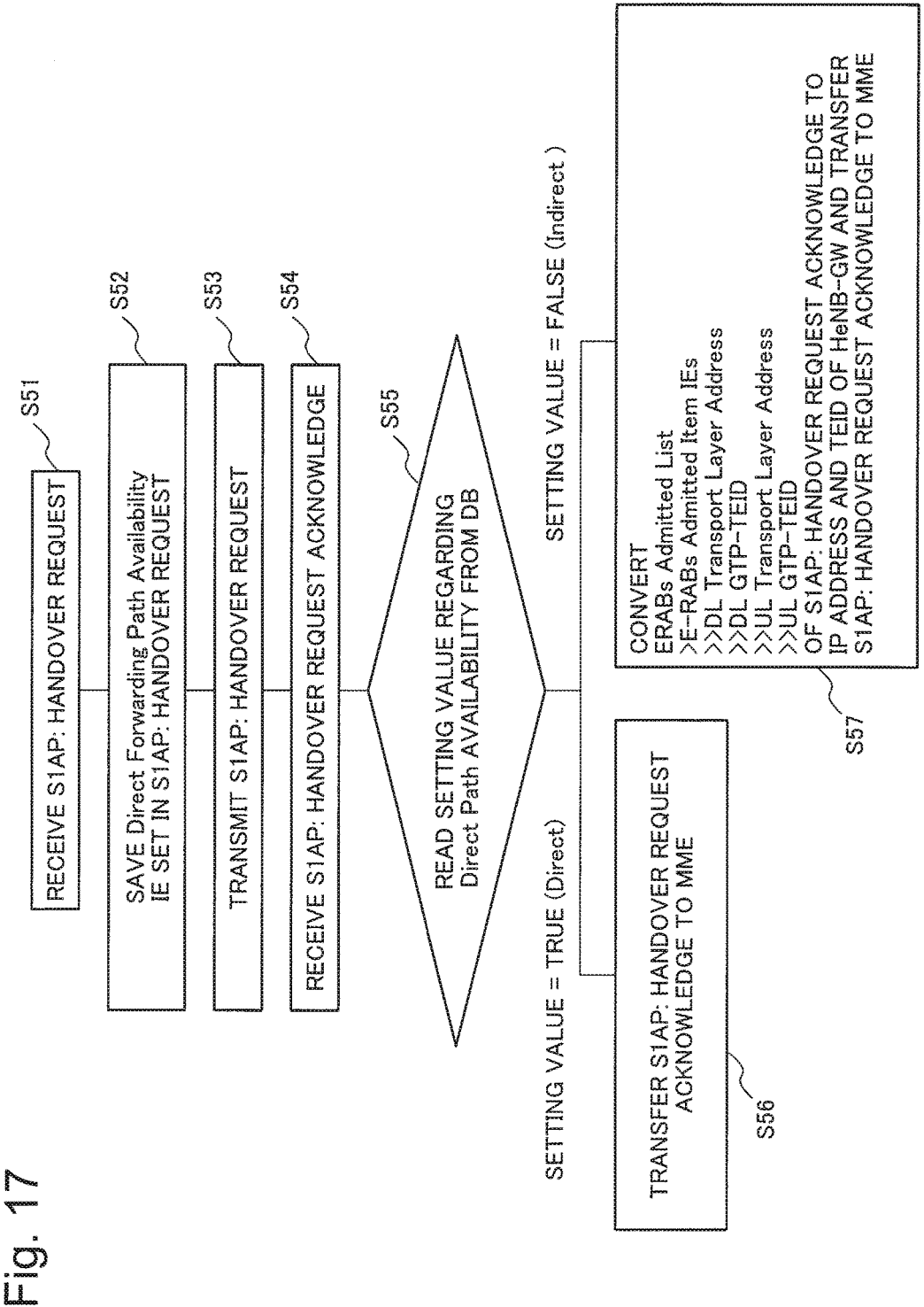
FIG. 17 is a diagram illustrating the flow of handover processing in a HeNB-GW according to Exemplary Embodiment 5.

In the descriptions for FIG. 17 and FIG. 18, the HeNB and the HeNB-GW have mainly been used for illustration. However, the HeNB may be an RN, and the HeNB-GW may be a DeNB.

By using the flow of handover processing according to Exemplary Embodiment 5, as described above, a T-HeNB-GW can determine the availability of Direct Forwarding for an S-HeNB, without adding new information to an existing S1AP: Handover Request message or the like.

Figure 19:
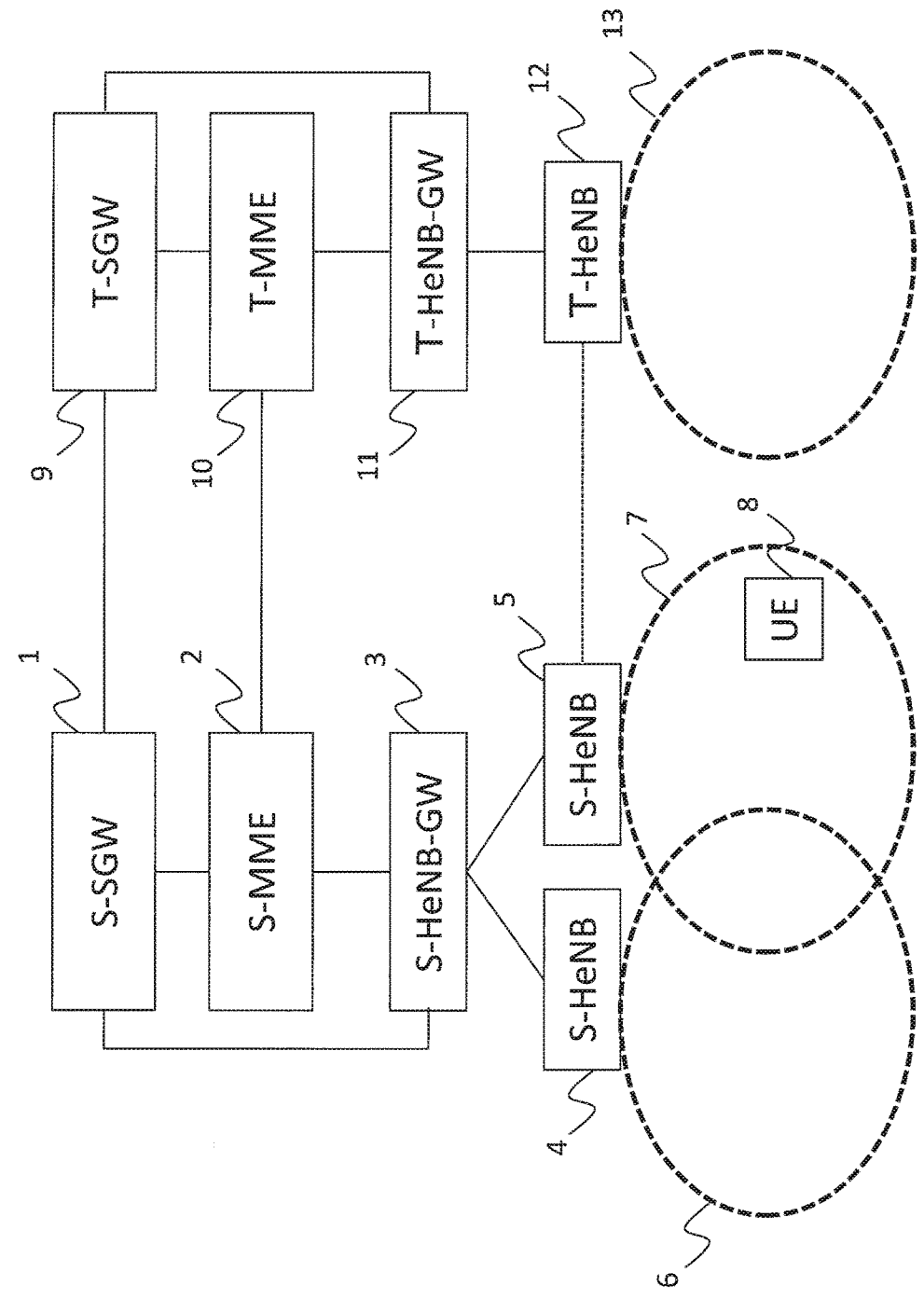
FIG. 19 is a configuration diagram of a mobile communication system according to an exemplary embodiment.

FIG. 19 shows a configuration of a wireless communication system of an exemplary embodiment.

A mobile communication system (LTE system) in FIG. 19 includes the Source Serving-Gateway (S-SGW) 1, the Target SGW (T-SGW) 9, the S-Mobility Management Entity (S-MME) 2, the T-MME 10, the S-Home eNB(HeNB)-GW 3, the T-HeNB-GW 11, the S-HeNB 4, the S-HeNB 5, and the T-HeNB 12.

The S-SGW 1 and the T-SGW 9 are configured to be capable of transmitting user data in a core network. The S-MME 2 and the T-MME 10 are configured to be capable of performing signal control or movement management of the UE 8 in the core network. Further, the S-MME 2 and the T-MME 10 are configured to be capable of performing setting processing of a user data path among the S-MME 2, the T-MME 10, and the S-HeNB-GW 3 and the T-HeNB-GW 11 described later.

The S-HeNB 4, the S-HeNB 5, and the T-HeNB 12 are femto base stations arranged in the LTE system. The communication area (coverage area) of the femto base station is several meters, several tens of meters, or the like. Compared to a general base station (e.g., macro base station) that forms a communication area of several kilometers, the communication area formed by the femto base station is narrow. The S-HeNB 4, the S-HeNB 5, and the T-HeNB 12 perform wireless communication with the UE 8 present in the respective cells, with the communication coverages being the cell 6, a cell 7, and the cell 13, respectively.

The S-HeNB-GW 3 and the T-HeNB-GW 11 are gateways accommodating a plurality of HeNBs and perform relay of user data and a control signal exchanged between the HeNB and the core network.

The S-HeNB 4 or the S-HeNB 5 show the HeNB forming the cell in which the UE 8 before moving is currently present. The S-HeNB-GW 3 accommodates the S-HeNB 4 and the S-HeNB 5, and the S-SGW 1 and the S-MME 2 are each connected with the S-HeNB-GW 3.

The T-HeNB 12 shows the HeNB forming the cell of the destination of the UE 8. The T-HeNB-GW 11 accommodates the T-HeNB 12, and the T-SGW 9 and the T-MME 10 are each connected with the T-HeNB-GW 11.

In FIG. 19, it is assumed that the UE 8 is present in the cell 7, and communication is performed through connection with the S-SGW 1 and the S-MME 2 of the core network via the S-HeNB 5 and the S-HeNB-GW 3. At this time, when the UE 8 moves to the cell 13, the S-HeNB 5 implements handover processing of the UE 8. The S-HeNB 5 transmits, to the T-HeNB 12, uplink user data or downlink user data that has not been able to be transmitted to the UE 8 during the handover processing. At this time, in the case of using Direct Forwarding, the S-HeNB 5 transfers data via a wired link (X2 link) directly connecting the S-HeNB 5 and the T-HeNB 12. In the case of using Indirect Forwarding, the S-HeNB 5 transfers data via the S-HeNB 5, the S-HeNB-GW 3, the S-SGW 1, the T-SGW 9, the T-HeNB-GW 11, and the T-HeNB 12. Data regarding a UE that has occurred during handover processing being transferred to a HeNB of the destination may be called data forwarding. Further, Direct Forwarding and Indirect Forwarding may be called the type of data forwarding.

The inventors of the present invention have found that the T-HeNB-GW 11 cannot recognize the type of data forwarding regarding whether the S-HeNB 5 performs Direct Forwarding or performs Indirect Forwarding. In other words, the T-MME 10 does not include a function of notifying the T-HeNB-GW 11 of the type of data forwarding of the S-HeNB 5. Therefore, there is a possibility that data forwarding fails. That is, the inventors of the present invention have found that this issue is caused by the T-HeNB-GW 11 not grasping information regarding the type of data forwarding.

With the exemplary embodiment described above, the issue is solved, and an appropriate device can be notified of information regarding the transfer path of data.

The base station according to Exemplary Embodiments 3 to 5 described above is a HeNB, but may also be, for example, an HNB or NB. In a similar manner, the communication device according to Exemplary Embodiments 3 to 5 is a HeNB-GW, but may also be an HNB-GW or NB-GW.

The mobile communication system according to Exemplary Embodiments 1 to 5 described above can be applied to, for example, a mobile communication system including an LTE network or a mobile communication system including a Wideband Code Division Multiple Access (WCDMA) (registered trademark) network.

In the exemplary embodiment described above, configurations of hardware have been described. However, an exemplary embodiment is not limited as such. For example, in an exemplary embodiment, it is possible to realize the processing in FIG. 5, FIG. 6, FIG. 8, and FIG. 17 by causing a central processing unit (CPU) to execute a computer program.

In the example described above, the program can be stored using various types of non-transitory computer readable medium and supplied to a computer. The non-transitory computer readable medium includes various types of tangible storage medium. Examples of the non-transitory computer readable medium include a magnetic recording medium (e.g., flexible disk, magnetic tape, or hard disk drive), a magneto-optical recording medium (e.g., magneto-optical disk), a CD Read Only Memory (ROM), a CD-R, a CD-R/W, and a semiconductor memory (e.g., mask ROM, Programmable ROM (PROM), Erasable PROM (EPROM), flash ROM, or Random Access Memory (RAM)). The program may be supplied to a computer by various types of transitory computer readable medium. Examples of the transitory computer readable medium include an electrical signal, an optical signal, and an electromagnetic wave. The transitory computer readable medium can supply the program to a computer via a wired communication path, such as an electrical wire or optical fiber, or a wireless communication path.

The invention of this application has been described above with reference to the exemplary embodiments. However, the invention of this application is not limited to the exemplary embodiments described above. To the configuration or details of the invention of this application, various changes comprehensible to those skilled in the art can be made within the scope of the invention of this application.

(Supplementary Note)

The scope of the present invention is not limited to the exemplary embodiments described and shown in the drawings and includes all exemplary embodiments that bring about an advantageous effect equivalent to an object of the present invention. Further, the scope of the present invention can be delimited by any desired combination of certain features out of all of the respective disclosed features.

A part or all of the exemplary embodiments described earlier can also be described as in the following respective supplementary notes. However, the following respective supplementary notes are obviously mere exemplifications of the present invention, and the present invention is not limited only to such cases.

(Supplementary Note 1)

A communication device that, in a case where a wireless terminal conducts a handover from a first device to a second device, includes means for performing communication with the second device and with a core network node and means for receiving control information from the core network node upon the handover, the control information being information regarding a transfer path of data to be transferred with respect to the second device from the first device.

(Supplementary Note 2)

The communication device according to supplementary note 1, wherein the control information is information indicating whether transfer of the data is performed with direct forwarding.

(Supplementary Note 3)

The communication device according to supplementary note 1 or 2, wherein the first device transmits the control information with respect to a core network including the core network node.

(Supplementary Note 4)

The communication device according to any one of supplementary notes 1 to 3, wherein the communication device is a gateway device of the second device.

(Supplementary Note 5)

The communication device according to any one of supplementary notes 1 to 4, wherein a tunnel used in a case of transferring the data with indirect forwarding is formed, in a case where the control information indicates that transfer of the data is performed with indirect forwarding.

(Supplementary Note 6)

The communication device according to any one of supplementary notes 1 to 5, wherein the communication device includes means for receiving a HANDOVER REQUEST ACK message from the second device and means for transmitting, in a case where the control information indicates that transfer of the data is performed with indirect forwarding, to the core network node a message in which identification information of the second device included in the HANDOVER REQUEST ACK message has been converted into identification information of the communication device.

(Supplementary Note 7)

The communication device according to any one of supplementary notes 1 to 6, wherein the control information is a Direct Forwarding Path Availability IE, and the means for receiving control information receives a HANDOVER REQUEST message including the Direct Forwarding Path Availability IE from the core network node.

(Supplementary Note 8)

The communication device according to any one of supplementary notes 1 to 6, wherein the control information is included in a Source to Target Transparent Container IE, and the means for receiving control information receives a HANDOVER REQUEST message including the Source to Target Transparent Container IE from the core network node.

(Supplementary Note 9)

A core network node that, in a case where a wireless terminal conducts a handover from a first device to a second device, includes means for performing communication with a communication device to perform communication with the second device and means for transmitting control information to the communication device upon the handover, the control information being information regarding a transfer path of data to be transferred with respect to the second device from the first device.

(Supplementary Note 10)

The core network node according to supplementary note 9, wherein the control information is information indicating whether transfer of the data is performed with direct forwarding.

(Supplementary Note 11)

The core network node according to supplementary note 9 or 10, wherein the control information is transmitted to a core network including the core network node from the first device.

(Supplementary Note 12)

The core network node according to any one of supplementary notes 9 to 11, wherein the communication device is a gateway device of the second device.

(Supplementary Note 13)

The core network node according to any one of supplementary notes 9 to 12, wherein a tunnel used in a case of transferring the data with indirect forwarding is formed, in a case where the control information indicates that transfer of the data is performed with indirect forwarding.

(Supplementary Note 14)

The core network node according to any one of supplementary notes 9 to 13, including means for receiving, in a case where the control information indicates that transfer of the data is performed with indirect forwarding, from the communication device a message in which identification information of the second device included in a HANDOVER REQUEST ACK message transmitted from the second device has been converted into identification information of the communication device.

(Supplementary Note 15)

The core network node according to any one of supplementary notes 9 to 14, wherein the control information is a Direct Forwarding Path Availability IE, and the means for transmitting control information transmits a HANDOVER REQUEST message including the Direct Forwarding Path Availability IE to the communication device.

(Supplementary Note 16)

The core network node according to any one of supplementary notes 9 to 14, wherein the control information is included in a Source to Target Transparent Container IE, and the means for transmitting control information transmits a HANDOVER REQUEST message including the Source to Target Transparent Container IE to the communication device.

(Supplementary Note 17)

A mobile communication system including a wireless terminal that performs a handover from a first device to a second device and a communication device that performs communication with the second device and with a core network node, the core network node transmitting control information with respect to the communication device upon the handover, and the control information being information regarding a transfer path of data to be transferred with respect to the second device from the first device.

(Supplementary Note 18)

The mobile communication system according to supplementary note 17, wherein the control information is information indicating whether transfer of the data is performed with direct forwarding.

(Supplementary Note 19) The mobile communication system according to supplementary note 17 or 18, wherein the first device transmits the control information with respect to a core network including the core network node.

(Supplementary Note 20)

The mobile communication system according to any one of supplementary notes 17 to 19, wherein the communication device is a gateway device of the second device.

(Supplementary Note 21)

The mobile communication system according to any one of supplementary notes 17 to 20, wherein a tunnel used in a case of transferring the data with indirect forwarding is formed, in a case where the control information indicates that transfer of the data is performed with indirect forwarding.

(Supplementary Note 22)

The mobile communication system according to any one of supplementary notes 17 to 21, wherein the communication device includes means for receiving a HANDOVER REQUEST ACK message from the second device and means for transmitting, in a case where the control information indicates that transfer of the data is performed with indirect forwarding, to the core network node a message in which identification information of the second device included in the HANDOVER REQUEST ACK message has been converted into identification information of the communication device.

(Supplementary Note 23)

The mobile communication system according to any one of claims 17 to 22, wherein the control information is a Direct Forwarding Path Availability IE, and the communication device receives a HANDOVER REQUEST message including the Direct Forwarding Path Availability IE from the core network node.

(Supplementary Note 24)

The mobile communication system according to any one of supplementary notes 17 to 22, wherein the control information is included in a Source to Target Transparent Container IE, and the communication device receives a HANDOVER REQUEST message including the Source to Target Transparent Container IE from the core network node.

(Supplementary Note 25)

A communication method including a receiving step wherein, in a case where a wireless terminal conducts a handover from a first device to a second device, control information that is information regarding a transfer path of data to be transferred with respect to the second device from the first device is received from a core network node upon the handover.

(Supplementary Note 26)

The communication method according to supplementary note 25, wherein the control information is information indicating whether transfer of the data is performed with direct forwarding.

(Supplementary Note 27)

The communication method according to supplementary note 25 or 26, wherein a tunnel used in a case of transferring the data with indirect forwarding is formed, in a case where the control information indicates that transfer of the data is performed with indirect forwarding.

(Supplementary Note 28)

The communication method according to any one of supplementary notes 25 to 27, including a step wherein, in a case where the control information indicates that transfer of the data is performed with indirect forwarding, a message in which identification information of the second device included in a HANDOVER REQUEST ACK message transmitted from the second device has been converted into identification information of the communication device itself is transmitted to the core network node, after the control information has been received.

(Supplementary Note 29)

The communication device according to any one of supplementary notes 25 to 28, wherein the control information is a Direct Forwarding Path Availability IE, and a HANDOVER REQUEST message including the Direct Forwarding Path Availability IE is received from the core network node in the receiving step.

(Supplementary Note 30)

The communication device according to any one of supplementary notes 25 to 28, wherein the control information is included in a Source to Target Transparent Container IE, and a HANDOVER REQUEST message including the Source to Target Transparent Container IE is received from the core network node in the receiving step.

(Supplementary Note 31)

A program for causing, in a case where a wireless terminal conducts a handover from a first device to a second device, a computer to execute a step of receiving, from a core network node upon the handover, control information that is information regarding a transfer path of data to be transferred with respect to the second device from the first device.

(Supplementary Note 32)

A storage medium storing, in a case where a wireless terminal conducts a handover from a first device to a second device, a program for causing a computer to execute a step of receiving, from a core network node upon the handover, control information that is information regarding a transfer path of data to be transferred with respect to the second device from the first device.

(Supplementary Note 33)

A communication device that, in a case where a wireless terminal conducts a handover from a first device to a second device, is configured to be capable of communicating with the second device and with a core network node and configured to be capable of receiving control information from the core network node upon the handover, the control information being information regarding a transfer path of data to be transferred with respect to the second device from the first device.

(Supplementary Note 34)

A communication device that, upon a handover of a wireless terminal from a first device to a second device, includes a communication unit configured to be capable of communicating with the second device and with a core network node and a receiver configured to be capable of receiving control information from the core network node upon the handover, the control information being information regarding a transfer path of data to be transferred with respect to the second device from the first device.

This application claims priority based on Japanese Patent Application No. 2013-158461 filed on Jul. 31, 2013, the disclosure of which is incorporated herein in its entirety.

REFERENCE SIGNS LIST

1 S-SGW
2 S-MME

3 S-HeNB-GW
4 S-HeNB
4A S-eNB
5 S-HeNB
6, 6A, 7 Cell
8 UE
9 T-SGW
10 T-MME
11 T-HeNB-GW
12 T-HeNB
13 Cell
15 Relay device
20 Core network control device
25 Core network node
21 Receiving unit
22 Transmitting unit
30 Communication device
31 Receiving unit
32 Transmitting unit
35 DeNB
40 Base station
41 RN
50 Base station
55 Device
60, 61, 70 Cell
80 Communication terminal
85 Wireless terminal
90 Relay device
100 Core network control device
101 Receiving unit
102 Transmitting unit
110 Communication device
111 Receiving unit
112 Transmitting unit
115 DeNB
120 Base station
125 Device
121 RN
130, 131 Cell

The invention claimed is:

1. A gateway device of a second base station, the gateway device comprising:
one or more processors configured to, when a wireless terminal conducts a handover from a first base station to the second base station,
communicate with the second base station and with a core network node,
receive control information from the core network node upon the handover,
receive, from the second base station, a message including identification information of the second base station,
determine, based on the control information, whether transfer of data is performed with indirect forwarding or with direct forwarding,
transmit, to the core network node, the message, when it is determined that the control information indicates that the transfer of the data is performed with direct forwarding, and
convert the identification information of the second base station included in the message into identification information of the gateway device, and transmit to the core network node a message including the identification information of the gateway device, when it is determined that the control information indicates that the transfer of the data is performed with indirect forwarding,
wherein the control information is information regarding a transfer path of data to be transferred from the first base station to the second base station.

2. The gateway device according to claim 1, wherein the control information is information indicating whether transfer of the data is performed with direct forwarding.

3. The gateway device according to claim 1, wherein the first base station transmits the control information to a core network including the core network node.

4. The gateway device according to claim 1, wherein a tunnel used when transferring the data with indirect forwarding is formed, when the control information indicates that transfer of the data is performed with indirect forwarding.

5. The gateway device according to claim 1, wherein the message including identification information of the second base station is a HANDOVER REQUEST ACK message.

6. The gateway device according to claim 1, wherein the control information is a Direct Forwarding Path Availability IE, and
wherein the gateway device receives a HANDOVER REQUEST message including the Direct Forwarding Path Availability IE from the core network node.

7. The gateway device according to claim 1, wherein the control information is included in a Source to Target Transparent Container IE, and
wherein the gateway device receives a HANDOVER REQUEST message including the Source to Target Transparent Container IE from the core network node.

8. A core network node comprising:
one or more processors configured to, when a wireless terminal conducts a handover from a first base station to a second base station,
communicate with a gateway device of the second base station to perform communication with the second base station,
transmit control information to the gateway device upon the handover,
receive, from the gateway device, a massage transmitted from the second base station, when the gateway device determines that the control information indicates that transfer of data is performed with direct forwarding, and
receive, from the gateway device, a message in which identification information of the second base station included in a message transmitted from the second base station has been converted into identification information of the gateway device, when the gateway device determines that the control information indicates that transfer of data is performed with indirect forwarding,
wherein the control information is information regarding a transfer path of data to be transferred from the first base station to the second base station.

9. The core network node according to claim 8, wherein the control information is information indicating whether transfer of the data is performed with direct forwarding.

10. The core network node according to claim 8, wherein the control information is transmitted from the first base station to a core network including the core network node.

11. The core network node according to claim 8,
wherein a tunnel used when transferring the data with indirect forwarding is formed, when the control information indicates that transfer of the data is performed with indirect forwarding.

12. The core network node according to claim 8, wherein the core network node is configured to receive a HANDOVER REQUEST ACK message transmitted from the second base station.

13. A communication method comprising:
receiving, when a wireless terminal conducts a handover from a first base station to a second base station, control information that is information regarding a transfer path of data to be transferred from the first base station to the second base station, from a core network node upon the handover;
receiving, from the second base station, a message including identification information of the second device;
determining, based on the control information, whether transfer of data is performed with indirect forwarding or with direct forwarding;
transmitting, to the core network node, the message including identification information of the second base station, when it is determined that the control information indicates that the transfer of the data is performed with direct forwarding; and
converting the identification information of the second base station included in the message into identification information of a gateway device of the second base station, and transmitting, to the core network node, a message including the identification information of the gateway device, when it is determined that the control information indicates that the transfer of the data is performed with indirect forwarding.

14. The communication method according to claim 13,
wherein the control information is information indicating whether transfer of the data is performed with direct forwarding.

15. The communication method according to claim 13,
wherein a tunnel used when transferring the data with indirect forwarding is formed, when the control information indicates that transfer of the data is performed with indirect forwarding.

16. The communication method according to claim 13,
wherein the message including identification information of the second base station is a HANDOVER REQUEST ACK message.

17. The communication method according to claim 13,
wherein the control information includes a Direct Forwarding Path Availability IE.

18. The communication method according to claim 13,
wherein the control information includes a Source to Target Transparent Container IE.

* * * * *